United States Patent
Motiwala et al.

(10) Patent No.: US 9,525,900 B2
(45) Date of Patent: Dec. 20, 2016

(54) VIDEO MANAGEMENT SYSTEM

(75) Inventors: Nilofer Fakhruddin Motiwala, San Francisco, CA (US); Matias Cudich, San Francisco, CA (US); Randy Simon, San Francisco, CA (US); Daniil Khidekel, Berkeley, CA (US); Gregory Allan Funk, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 1346 days.

(21) Appl. No.: 13/233,483

(22) Filed: Sep. 15, 2011

(65) Prior Publication Data

US 2013/0071087 A1   Mar. 21, 2013

(51) Int. Cl.
*G06F 17/00* (2006.01)
*H04N 21/25* (2011.01)
(Continued)

(52) U.S. Cl.
CPC ........... *H04N 21/252* (2013.01); *G06F 17/211* (2013.01); *G06F 17/30896* (2013.01); *G11B 27/034* (2013.01); *G11B 27/105* (2013.01); *G11B 27/34* (2013.01); *H04N 5/91* (2013.01); *H04N 21/458* (2013.01);
(Continued)

(58) Field of Classification Search
CPC  G06F 17/211; G06F 17/212; G06F 17/30056; G06F 17/30896; H04N 21/234327; H04N 21/47202; H04N 21/8549; H04N 21/4402; H04N 21/84; H04N 21/8455; H04N 21/47205; H04N 21/4622; H04N 21/458; H04N 9/8227; H04N 9/8205; H04N 9/7921; G11B 27/34; G11B 27/105; G11B 27/034
(Continued)

(56) References Cited

U.S. PATENT DOCUMENTS 7,460,601 B2   12/2008   Taniguchi
7,668,842 B2   2/2010    Lachapelle
(Continued)

FOREIGN PATENT DOCUMENTS

CN   104137553 A   11/2014
KR   2014-0079775 A   6/2014

OTHER PUBLICATIONS

P2P File Sharing, Internet, retrieved at, http://www.p2p-weblog.com/50226711/altnet_launches_global_file_registry.php, 3 pages.
(Continued)

*Primary Examiner* — Thu Huynh
(74) *Attorney, Agent, or Firm* — Lowenstein Sandler LLP

(57) ABSTRACT

A system and method for managing video data and metadata associated with the video data is disclosed. In one embodiment, a content management system receives video data and metadata associated with the video data, such as a title, a thumbnail image and a subject matter identifier. Instructions for a media player used to present the video data using a destination site are also generated to simplify distribution of the video data to one or more destination sites. The content management system further enables a user to edit the stored video data to customize placements of advertisements or other data within the video data by identifying one or more cue points in the video data. A data store is coupled to the content management system to store the video data and the metadata associated with the video data.

33 Claims, 13 Drawing Sheets

(51) Int. Cl.

| | | |
|---|---|---|
| *G06F 17/21* | (2006.01) | |
| *G06F 17/30* | (2006.01) | |
| *H04N 5/91* | (2006.01) | |
| *G11B 27/034* | (2006.01) | |
| *G11B 27/10* | (2006.01) | |
| *G11B 27/34* | (2006.01) | |
| *H04N 21/458* | (2011.01) | |
| *H04N 21/462* | (2011.01) | |
| *H04N 21/472* | (2011.01) | |
| *H04N 21/84* | (2011.01) | |
| *H04N 21/845* | (2011.01) | |
| *H04N 5/765* | (2006.01) | |
| *H04N 9/79* | (2006.01) | |
| *H04N 9/82* | (2006.01) | |
| *H04N 21/4402* | (2011.01) | |

(52) U.S. Cl.
 CPC ... *H04N 21/4622* (2013.01); *H04N 21/47205* (2013.01); *H04N 21/84* (2013.01); *H04N 21/8455* (2013.01); *H04N 5/765* (2013.01); *H04N 9/7921* (2013.01); *H04N 9/8205* (2013.01); *H04N 9/8227* (2013.01); *H04N 21/4402* (2013.01)

(58) Field of Classification Search
 USPC .......................... 715/200, 201–203, 234, 255
 See application file for complete search history.

(56) References Cited

U.S. PATENT DOCUMENTS

| | | | |
|---|---|---|---|
| 7,830,399 B2 | 11/2010 | Benson | |
| 8,438,191 B1* | 5/2013 | Chand et al. | 707/803 |
| 2003/0198256 A1 | 10/2003 | Wang et al. | |
| 2003/0212993 A1* | 11/2003 | Obrador | 725/9 |
| 2006/0265349 A1* | 11/2006 | Hicken | G06F 17/30743 |
| 2007/0250901 A1 | 10/2007 | Mcintire et al. | |
| 2007/0263128 A1* | 11/2007 | Zhang | 348/700 |
| 2008/0109369 A1 | 5/2008 | Su et al. | |
| 2008/0154889 A1* | 6/2008 | Pfeiffer | 707/5 |
| 2008/0154931 A1* | 6/2008 | Jacobs | H04L 67/22 |
| 2008/0177774 A1* | 7/2008 | Ruckart et al. | 707/102 |
| 2008/0260346 A1* | 10/2008 | Sukeda | H04H 60/73 |
| | | | 386/241 |
| 2008/0284910 A1* | 11/2008 | Erskine | G11B 27/11 |
| | | | 348/468 |
| 2009/0024923 A1* | 1/2009 | Hartwig | G06F 17/30781 |
| | | | 715/716 |
| 2009/0164419 A1 | 6/2009 | Taylor et al. | |
| 2010/0042928 A1* | 2/2010 | Rinearson | G06F 15/177 |
| | | | 715/737 |
| 2012/0017146 A1* | 1/2012 | Travieso et al. | 715/265 |
| 2012/0070125 A1* | 3/2012 | Lin et al. | 386/241 |
| 2014/0033025 A1* | 1/2014 | Mukherjee et al. | 715/246 |

OTHER PUBLICATIONS

Altnet, Internet, retrieved at, http://www.globalfileregistry.com/assets/Global_File_Registry_White_Paper.pdf, May 26, 2006, 20 pages.

International Search Report and Written Opinion, PCT/US2012/055737, Dec. 18, 2012, 20 pages.

* cited by examiner

VIDEO MANAGEMENT SYSTEM

BACKGROUND

Technical Field

The present disclosure generally relates to content management systems and, more specifically, to management and distribution of video data.

Background

Advances in network and computing technologies have allowed content, such as video data, image data and text data, to be more easily distributed to the public. Accordingly, an increasing amount of content is placed online, where it is accessible by a variety of users. Often, content is communicated to a destination site, which hosts the content and maintains web pages from which the content is accessed. For example, entities access a user's blog by accessing a destination site and viewing a web page including text and/or images of the user's blog. Similarly, a destination site receives video data and maintains one or more web pages that are accessed to view the video data.

Conventional content distribution techniques readily allow distribution of text and images by destination sites while also allowing content providers to have significant control over presentation of the text and image data by the destination site. However, these conventional systems limit the ability of content providers to control the appearance of the video data. Currently, video data is communicated to a destination site, and it is the destination site that specifies how the video data is presented. For example, the destination site uses a media player having an appearance specified by the destination site to present the video data. For example, a destination site may use a media player that superimposes a logo, or other branding, of the destination site over the video data or limits the size and placement of the media player presenting the video data. Further, when distributing video data to destination sites, conventional methods require individual entry of data associated with the video data to each destination site, increasing the time needed to distribute the video data to different destination sites.

SUMMARY

Embodiments disclosed herein provide a system and method for managing video data and communicating video data to one or more destination sites. One embodiment includes a content management system that receives video data, metadata associated with the video data and generates data configuring a media player for presenting the video data. The content management system communicates the video data to a data store that stores the video data, the metadata and the media player configuration data. The content management system also receives a request to access the video data that includes search terms and the data store retrieves the video data by identifying stored metadata similar to the received search terms and communicates the video data and associated metadata to the content management system.

In one embodiment, the content management system includes a thumbnail editor that identifies a plurality of images, such as frames from the video data. The thumbnail editor sets a thumbnail image associated with video data to a first image from the plurality of images and communicates the first image to one or more destination sites. First analytical data describing interaction with the video data when the first image is the thumbnail image is received and the thumbnail editor sets a second image from the plurality of images as the thumbnail image and communicates the second image to one or more destination sties. Second analytical data describing interaction with the video data when the second image is the thumbnail image is received. The thumbnail image associated with the video data is then determined using the first and second analytical data.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The embodiments are illustrated by way of example, and not by way of limitation in the figures of the accompanying drawings in which like reference numerals are used to refer to similar elements.

DETAILED DESCRIPTION

Figure 1:
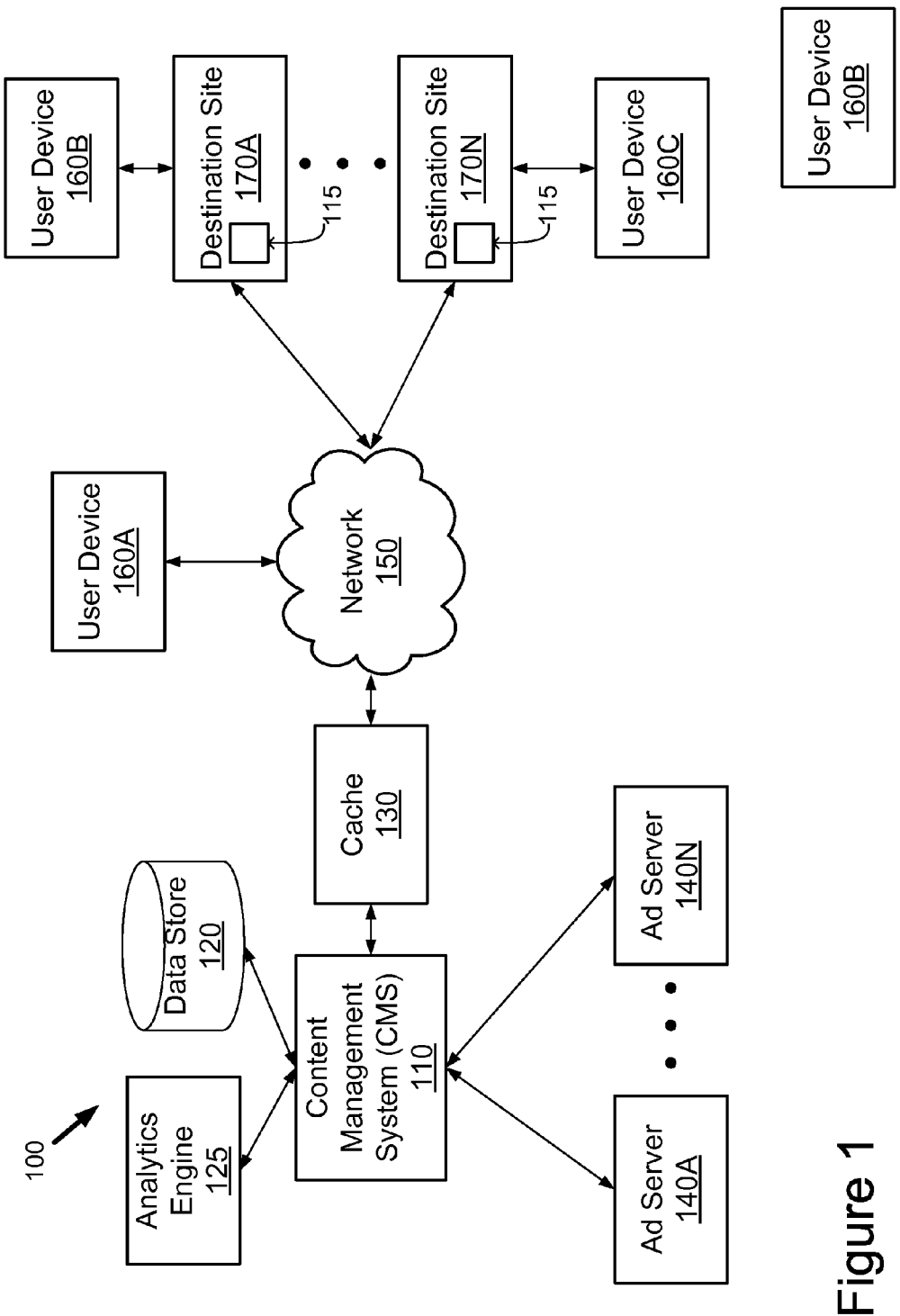
FIG. 1 is a block diagram of one embodiment of a computing environment including a content management system in accordance with an embodiment.

A content management system simplifying distribution of video data to destination sites and maintenance of metadata associated with the video data is described below. In the following description, for purposes of explanation, numerous specific details are set forth to provide a thorough understanding of the various embodiments. However, it will be apparent to one skilled in the art that the various embodiments can be practiced without these specific details. In other instances, structures and devices are shown in block diagram form in order to avoid obscuring the certain details.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the following detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present embodiments also relate to an apparatus for performing the operations herein. This apparatus may be specially constructed for the required purposes, or it may be a general-purpose computer selectively activated or reconfigured by a computer program stored in the computer. The embodiments disclosed may take the form of an entirely hardware embodiment, an entirely software embodiment or an embodiment including both hardware and software elements. One embodiment is implemented in software comprising instructions or data stored on a computer-readable storage medium, which includes but is not limited to firmware, resident software, microcode or another method for storing instructions for execution by a processor.

Furthermore, the embodiments may take the form of a computer program product accessible from a computer-usable or computer-readable storage medium providing program code for use by, or in connection with, a computer or any instruction execution system. For the purposes of this description, a computer-usable or computer readable storage medium is any apparatus that can contain, store or transport the program for use by or in connection with the instruction execution system, apparatus or device. The computer-readable storage medium can be an electronic, magnetic, optical, electromagnetic, infrared, or semiconductor system (or apparatus or device) or a propagation medium. Examples of a tangible computer-readable storage medium include a semiconductor or solid state memory, magnetic tape, a removable computer diskette, a random access memory (RAM), a read-only memory (ROM), a rigid magnetic disk, an optical disk, an EPROM, an EEPROM, a magnetic card or an optical card. Examples of optical disks include compact disk—read only memory (CD-ROM), compact disk—read/write (CD-R/W) and digital video disc (DVD).

A data processing system suitable for storing and/or executing program code includes at least one processor coupled directly or indirectly to memory elements through a system bus. The memory elements may include local memory employed during actual execution of the program code, bulk storage and cache memories providing temporary storage of at least some program code in order to reduce the number of times code must be retrieved from bulk storage during execution. In some embodiments, input/output (I/O) devices (such as keyboards, displays, pointing devices or other devices configured to receive data or to present data) are coupled to the system either directly or through intervening I/O controllers.

Network adapters may also be coupled to the data processing system to allow coupling to other data processing systems or remote printers or storage devices through intervening private or public networks. Modems, cable modem and Ethernet cards are just examples of the currently available types of network adapters.

Finally, the algorithms and displays presented herein are not inherently related to any particular computer or other apparatus. Various general-purpose systems may be used with programs in accordance with the embodiments described herein, or it may prove convenient to construct more specialized apparatus to perform the required method steps. The required structure for a variety of these systems will appear from the description below. It will be appreciated that a variety of programming languages may be used to implement the embodiments as described herein.

System Overview

FIG. 1 shows an embodiment of a system 100 for distributing and maintaining video data and metadata associated with the video data. In the embodiment depicted by FIG. 1, the system 100 includes a content management system (CMS) 110, a data store 120, an analytics engine 125, a cache 130, one or more advertisement servers ("ad servers") 140A-140N (also referred to individually and collectively as 140), a network 150, one or more user devices 160A, 160B, 160C (also referred to individually and collectively as 160) and one or more destination sites 170A-170N (also referred to individually and collectively as 170). Additionally, FIG. 1 also illustrates a media player 115 operating on a destination site 170. However, in other embodiments, the system 100 may include different and/or additional components than those depicted by FIG. 1.

The CMS 110 includes one or more processors and one or more storage devices storing data or instructions for execution by the one or more processors. For example, the CMS 110 is a server, a server array or any other computing device, or group of computing devices, having data processing and communication capabilities. The CMS 110 receives video data and metadata from one or more user devices 160 or other sources. The CMS 110 associates the metadata with the video data and communicates the metadata, video data and association between video data and metadata to the data store 110, allowing the data store 110 to maintain relationships between video data and the metadata. Additionally, the CMS 110 receives requests for stored video data from a user device 160 and retrieves video data and metadata associated with the stored video data from the data store 120.

The CMS 110 also generates data or instructions for configuring a media player 115 used to present the video data when executed by a processor. In one embodiment, the data for configuring the media player 115 is "embed code" that is included in a web page. The CMS 110 generates the data for media player 115 configuration, such as embed code, based on the video data and the metadata associated with the video data.

Additionally, the CMS 110 includes data or instructions for generating one or more user interfaces displaying video data and metadata retrieved from the data store 120. The user interfaces generated by the CMS 110 simplify user review and modification of metadata associated with the video data, allowing users to more easily customize presentation of the video data to other users via a destination site 170 and presentation of content along with the video data. For example, a user interface generated by the CMS 110 allows a user to customize the branding or skin of an embedded media player 115 used to present the video data when retrieved from a destination site 170 by modifying the metadata used by the CMS 110 to generate media player configuration data. As another example, a user interface generated by the CMS 110 allows a user to customize the temporal location and placement of supplemental content, such as advertisements, within video data when the video data is presented by a media player 115 operating on a user device 160. The CMS 110 is further described below in conjunction with FIGS. 2A and 2B, while FIGS. 8-13 provide examples of user interfaces generated by the CMS 110.

The data store 120 is a non-volatile memory device or similar persistent storage device and media coupled to the CMS 110 for storing video data and metadata associated with stored video data. For example, the data store 120 and the CMS 110 exchange data with each other via the network 150. Alternatively, the data store 120 and the CMS 110 exchange data via a dedicated communication channel. While the embodiment shown by FIG. 1 depicts the data store 120 and CMS 110 as discrete components, in other embodiments a single component includes the data store 120 and the CMS 110.

In one embodiment, the data store 120 includes one or more tables associating metadata with video data. For example, the data store 120 includes a table where an entry in the table includes a field identifying the video data and additional fields include metadata associated with the video data. Additionally, the data store 120 may include additional tables identifying data used by a destination site 170 when storing video data for access by user devices 160. In one embodiment, the data store 120 includes data mapping metadata associated with video data to data used by a destination site 170. The mapping of metadata associated with video data to data used by a destination site 170 allows the data store 120 to automatically map metadata associated with video data with one or more data fields used by a destination site 170, reducing the time for a destination site 170 to store and communicate video data from the data store 120 to a user device 160. In one embodiment, the data store 120 or the CMS 110 includes an index to expedite identification and/or retrieval of stored data from the data store 120. The data store 120 is further described below in conjunction with FIG. 4.

The analytics engine 125 is one or more devices having at least one processor coupled to at least one storage device including instructions for execution by the processor. For example, the analytics engine 125 is one or more servers or other computing devices having data processing and data communication capabilities. The analytics engine 125 receives data describing website usage based on interactions with the website by user devices 160. In one embodiment, data from the user devices 160 is communicated to the CMS 110 by a destination site 170 hosting the website and the CMS 110 communicates the received data to the analytics engine 125. For example, the analytics engine 125 determines the location of user devices 160 accessing a website by Internet Protocol (IP) geolocation, performs click analytics describing interactions with a web page within a website, determines the number of times a web page has been loaded, determines the number of times the web page has been loaded by unique user devices 160 and/or determines other types of analytic data describing interaction with web pages within a web site.

Additionally, the analytics engine 125 receives data describing user interaction with video data included on one or more web pages maintained by the website from the CMS 110. For example, when a user device 160 accesses video data through a destination site 170, data is communicated from the destination site 170 maintaining the web pages including the video data accessed by the user device 160 and from a media player 115 executed by the user device 160 to the CMS 110 and to the analytics engine 125. Data from the media player 115 provides the analytics engine 125 with information from the user device 160 describing interaction with the video data presented by the media player 115. As an example, data from a media player 115 communicated to the content management system (CMS) 110 and the analytics engine 125 describes when the media player 115 was loaded by the user device 160, whether the media player 115 is used to play video, the length of time the media player 115 presents video data, whether video presented by the media player 115 is paused or other interactions between a user of the user device 160 and the media player 115.

Receiving data from the CMS 110 and/or from a media player 115 describing website usage and video access within a website allows the analytics engine 125 to generate data describing the effect of video content on web page or website usage. Additionally, data generated by the analytics engine 125 may also describe how elements within a web page affect user access of video data. For example, by analyzing website usage data and video access data the analytics engine 125 generates data describing how association of different thumbnail images with video data affects the frequency with which user devices 160 access the video data. In one embodiment, the analytics engine 125 stores data describing the number of times a media player 115 is loaded by a user device 160 and used to present video data when different thumbnail images are associated with the video data, allowing identification of a thumbnail image that increases the frequency with which the video data is accessed.

Based on website usage data and video access data, the analytics engine 125 generates one or more reports describing website usage, video access and/or video access in conjunction with website usage. For example, the analytics engine 125 generates a report describing how video data is accessed whenever is it played back, regardless of the destination site 170 used to view the video data; the analytics engine 125 may also generate a report describing video data access within a specific destination site 170, providing information about interaction with video data stored in a specific destination site 170. In one embodiment, the analytics engine 125 includes data describing one or more predefined reports of website usage and/or video access to simplify analysis. However, the analytics engine 125 also receives data from the CMS 110 describing generation of specific reports allowing a user to produce customized reports of website usage and/or video access. In one embodiment, a report is communicated from the analytics engine 125 to the CMS 110 via the network 150 and the CMS 110 communicates the reports to a user device 160.

The cache 130 is coupled to the content management system (CMS) 110 using the network 150 or using a direct communication channel between the CMS 110 and the cache 130. When a user device 160 or a destination site 170 retrieves video data from the data store 120, the CMS 110 communicates the video data to the cache 130, which stores a copy of the retrieved video data. Similarly, a request for video data from a user device 160 or a destination site 170 is initially transmitted via the network 150 to the cache 130 and the requested video data is communicated to the user device 160 or the destination site 170 by the cache 130 if a copy of the video data is stored by the cache 130. If the cache 130 does not include a copy of the requested video data, the request is communicated from the cache 130 to the CMS 110 to retrieve the video data. Hence, the cache 130 expedites retrieval of video data. While FIG. 1 illustrates a single cache 130, in other embodiments, the system 100 may include multiple caches 130. For example, a metadata cache stores metadata or syndication data associated with video data and a video cache stores video data.

The one or more advertisement servers ("ad servers") 140A-140N are one or more computing devices having a processor and a computer-readable storage medium storing advertisements and data for selecting advertisements. An ad server 140 communicates with the CMS 110 via the network 150 or via a communication channel with the CMS 110. Also, an ad server 140 communicates with destination sites 170 or user devices 160 via the network 150 to communicate advertisements for presentation when a web page is accessed. An ad server 140 also includes rules for targeting advertisements to specific users, for targeting advertisements to be displayed in conjunction with types of content, for targeting advertisements to specific locations or Internet Protocol (IP) addresses or other rules for selecting and/or targeting advertisements.

An ad server 140 receives metadata associated with video data from the CMS 110 and selects advertisements for presentation in conjunction with the video data based on the metadata. For example, the ad server 140 selects stored advertisements based on keywords associated with the video data. Thus, modification of the metadata associated with the video data using the CMS 110 enables modification of the advertisements presented in conjunction with the video data.

The network 150 is a conventional network and may have any number of configurations such as a star configuration, a token ring configuration or another configuration known to those skilled in the art. In various embodiments, the network 150 is a wireless network, a wired network or a combination of a wireless and a wired network. Furthermore, the network 150 may be a local area network (LAN), a wide area network (WAN) (e.g., the Internet) and/or any other interconnected data path across which multiple devices may communicate. In yet another embodiment, the network 150 may be a peer-to-peer network.

The network 150 may also be coupled to, or include, portions of a telecommunications network for communicating data using a variety of different communication protocols. In yet another embodiment, the network 150 includes a Bluetooth communication network and/or a cellular communications network for sending and receiving data. For example, the network 150 transmits and/or receives data using one or more communication protocols such as short messaging service (SMS), multimedia messaging service (MMS), hypertext transfer protocol (HTTP), direct data connection, WAP, email or another suitable communication protocol.

The one or more user devices 160A, 160B, 160C are computing devices having data processing and data communication capabilities. For example, a user device 160 comprises a desktop computer, a laptop computer, a netbook computer, a tablet computer, a smartphone or an internet capable television. In one embodiment, different user devices 160A, 160B, 160C comprise different types of computing devices. For example user device 160A may be a smartphone, user device 160B may be a tablet computer and user device 160C may be a laptop computer. A user device 160 receives data from a user identifying video data and transmits the received data to a destination site 170 or to the CMS 110 via the network 150. The user device 160 then receives the identified video data through the network 150, allowing presentation of the video data by the user device 160. Similarly, the user device 160 receives metadata associated with video data from a user and transmits the metadata to the CMS 110 via the network 150 or receives metadata associated with video data from the CMS 110 from the network 150, allowing a user to view and/or modify the metadata using the user device 160.

A user device 160 transmits data to the CMS 110 via the network 150 and receives data from the CMS 110 and/or the cache 130 via the network 150. For example, a user device 160 communicates video data to the CMS 110 via the network 150 or receives metadata associated with video data and/or user interface data from the CMS 110. Additionally, a user device 160 receives data from a destination site 170 using the network 150. For example, a user device 160 receives a media player 115 from the CMS 110 to view video data identified or presented by a destination site 170.

The destination sites 170A-170N are computing devices having data processing and data communication capabilities, such as web servers. A destination site 170 includes data describing a website that includes one or more web pages and communicates one or more web pages to a user device 160 via the network 150. One or more web pages stored by a destination site 170 include data or instructions for presenting video data by executing a media player 115 on the user device 160. In one embodiment, a destination site 170 retrieves video data and the media player 115 used to present the video data from the CMS 110, allowing the destination site 170 to present video data using the architecture of the CMS 110. Alternatively, a destination site 170 receives video data and media player configuration data from the CMS 110 and embeds the video data and media player configuration data into web pages to present video data. For example, a destination site 170 receives embed code describing operation of the media player 115 and identifying video data presented by the media player 115 and includes the embed code in a web page. Hence, in one embodiment a destination site 170 communicates with the CMS 110 and uses the CMS 110 to retrieve data and metadata from the data store 120 to present video data to user devices 160. In an alternate embodiment, the CMS 110 communicates a media player 115 video data and metadata from the data store 120 to the destination site 170, allowing the destination site 170 to embed the media player 115 from the CMS 110 into one or more web pages included in the destination site 170 or into one or more web pages included in another destination site 170 associated with the destination site 170 receiving the media player 115 and video data.

Different destination sites 170 may use different data to store and identify video data. For example, destination site 170A associates a title, a category and privacy data with video data stored by destination site 170A while destination site 170N merely associates a title with video data maintained by the destination site 170N. To facilitate distribution of video data from the data store 120 to destination sites 170, the CMS 110 and the data store 120 allow metadata associated with the video data and stored by the data store 120 to be associated with data used by a destination site 170. For example, a video title, a video description, a video category and keywords associated with the video data by the CMS 110 may be linked to various data fields associated with a destination site 170A, so that the CMS 110 retrieves the video title, video description, video category and keywords from the data store 120 and communicates the retrieved data the destination site 170A to expedite communication of the video data to the destination site 170A. Additionally, the CMS 110 may receive data specifically used by a specific destination site 170, store the data in the data store 120 and communicate the data to the specific destination site 170. Hence, the CMS 110 may receive data used to communicate video data to a specific destination site 170A in addition to metadata used to communicate video data to multiple destination sites 170A-170N Content Management System (CMS) 110

Figure 2A:
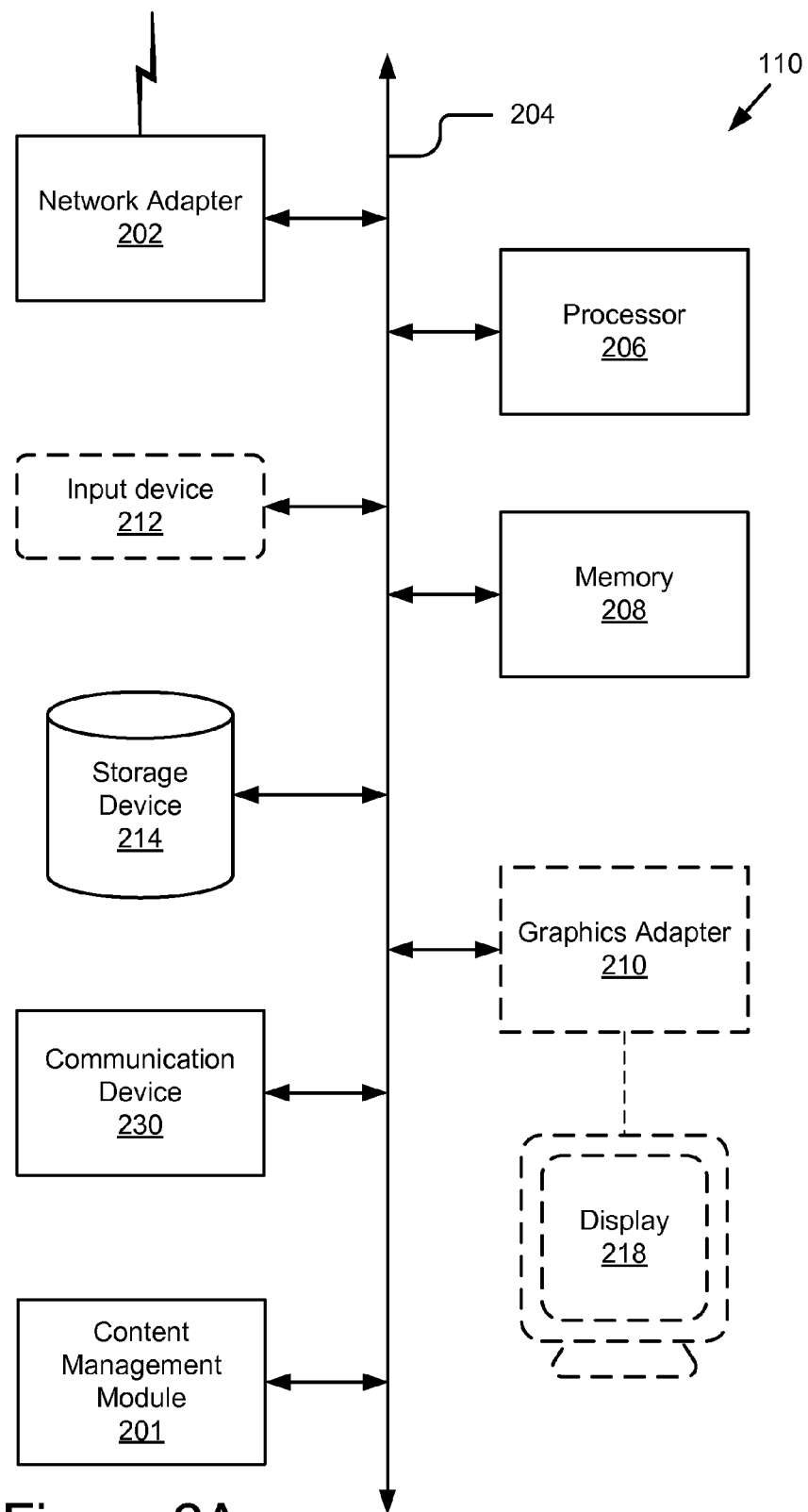
FIG. 2A is a block diagram of a content management system in accordance with an embodiment.

FIG. 2A is a block diagram of an embodiment of a content management system 110 in accordance with one embodiment. As illustrated in FIG. 2A, content management system 110 includes a network adapter 202 coupled to a bus 204. According to one embodiment, also coupled to the bus 204 are at least one processor 206, memory 208, a graphics adapter 210, an input device 212, a storage device 214, and a communication device 230. In one embodiment, the functionality of the bus 204 is provided by an interconnecting chipset. The content management system 110 also includes a display 218, which is coupled to the graphics adapter 210.

The processor 206 may be any general-purpose processor. The processor 206 comprises an arithmetic logic unit, a microprocessor, a general purpose controller or some other processor array to perform computations, provide electronic display signals to display 218. The processor 206 is coupled to the bus 204 for communication with the other components of the content management system 110. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The content management system 110 also includes an operating system executable by the processor such as but not limited to WINDOWS®, MacOS X, Android, or UNIX® based operating systems.

The memory 208 holds instructions and data used by the processor 206. The instructions and/or data comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory such as a hard disk drive or flash drive for storing log information on a more permanent basis. The memory 208 is coupled by the bus 204 for communication with the other components of the content management module 110. In one embodiment, the content management module 201 is stored in memory 208 and executable by the processor 206.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 208 and comprises one or more devices including a hard disk drive, a floppy disk drive, a CD-ROM device, a DVD-ROM device, a DVD-RAM device, a DVD-RW device, a flash memory device, or some other mass storage device known in the art. In some embodiments, the storage device 214 includes instructions and/or data for maintaining metadata associated with video data, for modifying stored metadata or for retrieving stored video data or stored metadata associated with stored video data. For clarity, instructions and/or data stored by the storage device 214 are described herein as different functional "modules," where different modules are different instructions and/or data included in the storage device that cause the described functionality when executed by the processor 206.

The input device 212 may include a mouse, track ball, or other type of pointing device to input data into the content management system 110. The input device 212 may also include a keyboard, such as a QWERTY keyboard. The input device 212 may also include a microphone, a web camera or similar audio or video capture device. The graphics adapter 210 displays images and other information on the display 218. The display 218 is a conventional type such as a liquid crystal display (LCD) or any other similarly equipped display device, screen, or monitor. The display 218 represents any device equipped to display electronic images and data as described herein. The network adapter 202 couples the content management system 110 to a local or wide area network.

The communication device 230 transmits data from the CMS 110 to the network 150 and receives data from the network 150. The communication device 230 is coupled to the bus 204. In one embodiment, the communication device 230 also exchanges data with one or more of the analytics server 123, the data store 120, the cache 130 and/or one or more advertising servers 140 using communication channels other than the network 150. In one embodiment, the communication device 230 includes a port for direct physical connection to the network 150 or to another communication channel. For example, the communication device 230 includes a USB, SD, CAT-5 or similar port for wired communication with the network 150. In another embodiment, the communication device 230 includes a wireless transceiver for exchanging data with the network 150, or with another communication channel, using one or more wireless communication methods, such as IEEE 802.11, IEEE 802.16, BLUETOOTH® or another suitable wireless communication method.

In yet another embodiment, the communication device 230 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication device 230 includes a wired port and a wireless transceiver. The communication device 230 also provides other conventional connections to the network 150 for distribution of files and/or media objects using standard network protocols such as TCP/IP, HTTP, HTTPS and SMTP as will be understood to those skilled in the art.

FIG. 2A further illustrates a content management module 201 communicating over bus 204 with the other components of the content management system 110. The content management module 201 provides logic and instructions for capturing and analyzing interactions with video data and interactions with web pages used to present the video data. In an embodiment, the content management module 201 can be implemented in hardware (e.g., in an FPGA), as illustrated in FIG. 2A. In another embodiment, the content management module 201 can include software routines and instructions that are stored, for example, in memory 208 and/or storage device 214 and executable by the processor 206 to cause the processor to capture and analyze interactions with video data and interactions with web pages used to present the video data. Details describing the functionality and components of the content management module 201 will be explained in further detail below with regard to FIG. 2B.

As is known in the art, the content management system 110 can have different and/or other components than those shown in FIG. 2A. In addition, the content management system 110 can lack certain illustrated components. In one embodiment, the content management system 110 lacks an input device 212, graphics adapter 210, and/or display 218. Moreover, the storage device 214 can be local and/or remote from the content management system 110 (such as embodied within a storage area network (SAN)).

As is known in the art, the content management system 110 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 214, loaded into the memory 208, and executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Content Management Module 201

Figure 2B:
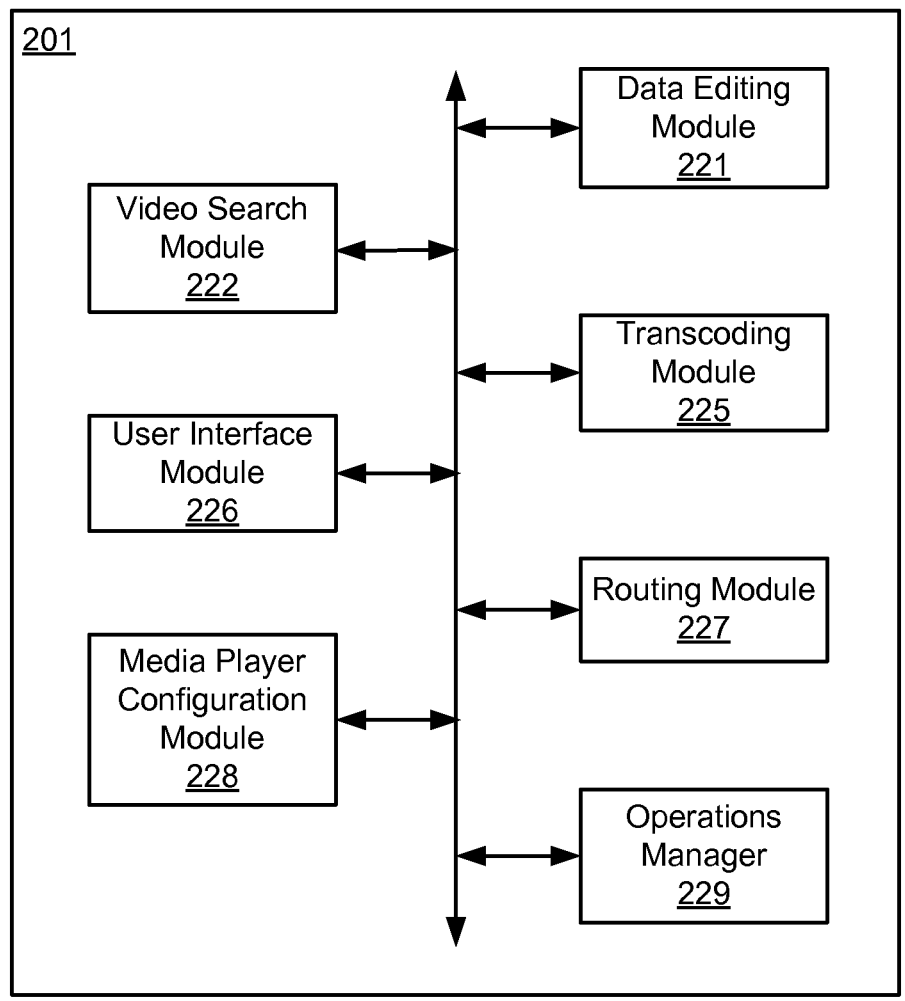
FIG. 2B is a block diagram illustrating a content management module in accordance with an embodiment.

FIG. 2B is a block diagram illustrating the components and/or organization of the content management module 201 according to one embodiment. The content management module 201 is software and routines executable by the processor 206 for capturing and analyzing interactions with video data and interactions with web pages used to present the video data. In one embodiment, the content management module 201 is a set of instructions executable by the processor 206 to provide the functionality described below for capturing and analyzing interactions with video data and interactions with web pages used to present the video data within the system 100. In another embodiment, the content management module 201 is stored in the memory 208 of the content management system 110 and is accessible and executable by the processor 206. In either embodiment, the content management module 201 is adapted for cooperation and communication with the processor 206 and other components of the content management system 110.

In the embodiment depicted by FIG. 2B, the content management module 201 includes a data editing module 221, a video search module 222, a transcoding module 225, a user interface module 226, a routing module 227, a media player configuration module 228 and an operations manager 229. However, in other embodiments, the storage device 214 includes different and/or additional modules than the ones depicted in FIG. 2B. The content management module 201 is coupled to the processor 206 and the communication device 230 via a bus 204. However, in other embodiments the content management module 201 may include different and/or additional components than the ones shown by FIG. 2B.

In one embodiment, the modules are implemented using instructions and/or data included in the storage device 214, in another embodiment, the modules are implemented using one or more hardware devices configured to provide the functionality further described below. For example, the modules are implemented using one or more application specific integrated circuits (ASICs) and/or one or more field programmable gate arrays (FPGAs) coupled via a bus configured to provide the functionality of the modules further described below.

The data editing module 221 is software and routines executable by the processor 206 for modifying metadata and/or video data stored in the data store 120. In one embodiment, the data editing module 221 receives data from the user interface module 226 and uses the received data to generate or modify metadata that is stored by the data store 120. Additionally, the data editing module 221 generates or modifies playlists including a sequence of video data based on data received from a user device 160 via the user interface module 226. For example, the user interface module 226 receives data from a user device 160, via the network 150 and the bus 204, modifying stored metadata associated with video data or identifying metadata for association with video data. The data editing module 221 then modifies metadata associated with the video data using the received data or stores the received metadata and an association between the received metadata and video data, as further described below.

In one embodiment, the data editing module 221 generates an instruction identifying the metadata to be modified and the modification to the metadata or identifying metadata and video data associated with the metadata. The generated instruction is then transmitted to the data store 120 by the communication device 230 to modify the metadata. Similarly, the data editing module 221 generates an instruction modifying a playlist, identifying modifications to the video data included in the playlist or identifying one or more attributes associated with the playlist to be modified. The generated instruction is transmitted to the data store 120 via the bus 204, communication device 230 and the network 150.

The video search module 222 is software and routines executable by the processor 206 for generating data or instructions for retrieving video data from the data store 120 based on received input, such as search terms. The video search module 222 searches the data store 120 for metadata matching, or similar to, search terms received from the communication device 230 and/or from the user interface module 226. Hence, the video search module 222 allows users to more easily retrieve stored video data using metadata associated with the stored video data. For example, the video search module 222 accesses the data store 120 via the network 150, communication device 230 and the bus 204 to identify video data stored by the data store 120 and associated with metadata matching, or similar to, search terms received from the communication device 230 and/or from the user interface module 226.

Rather than require navigation through a directory structure to retrieve stored video data, like conventional data retrieval, the video search module 222 searches metadata associated with stored video data to identify and retrieve stored video data. In one embodiment, the video search module 222 also receives data limiting the metadata to which the search terms are compared. For example, the video search module 222 receives input limiting comparison of search terms to metadata specifying video title and not to other metadata. The video search module 222 also receives data from the data store 120 describing stored video data associated with metadata matching, or similar to, the search terms. The video search module 222 communicates the description of the stored video data to the user interface module 226 via the bus 204, and the user interface module 226 generates a user interface presenting the video data from the data store 120 to a user.

The transcoding module 225 is software and routines executable by the processor 206 for generating a copy of the video data encoded in a different format than the video data's original format. The transcoding module 225 includes one or more codecs for generating differently encoded copies of the video data. For example, the transcoding module 225 includes multiple video codecs, such as H.262/MPEG-2 Part 2 codecs, H.264/MPEG-4 Advanced Video Coding codecs, MPEG-4 Part 2 codecs, VP8 codecs or other video codecs. By storing different video codecs, the transcoding module 225 enables generation of a compressed version of stored video data by encoding the video data with one or more of the stored video codecs. The differently-encoded copy of the video data is communicated to the data store 120 for storage and association with the original video data.

In one embodiment, the transcoding module 225 automatically encodes video data received by the CMS 110 using one or more predetermined codecs to generate one or more compressed versions of the video data, which are stored in the data store 120 along with the original video data. For example, the transcoding module 225 automatically encodes video data using one or more commonly-used codecs, such as one or more H.264/MPEG-4 Advanced Video Coding codecs or one or more VP8 codecs. This simplifies distribution of the video data to destination sites 170 by automatically generating compressed versions of the video data using codecs most commonly used by destination sites 170. In one embodiment, input received by the user interface module 226 allows a user to specify one or more codecs that are automatically applied to video data. For example, a user specifies a list of codecs to produce compressed video data compatible with user-desired destination sites 170, allowing the CMS 110 to automatically generate video data compatible with the user-desired destination sites 170.

The transcoding module 225 may also receive input via the user interface module 226, allowing manual identification of a codec and encode video data using the identified codec. Additionally, a user may communicate one or more codecs to the CMS 110 via the network 150 and the transcoding module 225 stores the user-supplied codecs for subsequent use. Additionally, destination sites 170 may communicate codecs to the transcoding module 225 via the network 150, allowing the transcoding module 226 to dynamically modify the codecs used. The transcoding module 226 may also modify the one or more codecs automatically applied to video data responsive to data from destination sites 170 and/or from user devices 160, enabling dynamic modification of video encoding as different and/or additional codecs become more commonly used.

The user interface module 226 is software and routines executable by the processor 206 for generating one or more user interfaces for receiving data from a user and/or presenting video data and/or metadata associated with video data to a user. For example, the user interface module 226 includes instructions that, when executed by a processor 206, generate user interfaces for displaying metadata associated with video data and/or modifying metadata associated with video data. In one embodiment, data stored in the interface module 226 is communicated to a user device 160 via the communication device 230 and the network 150, and a processor included in the user device 160 generates a user interface by executing the instructions provided by the user interface module 226.

In one embodiment, a user interface generated by the interface module 226 displays metadata, associated with video data, stored by data store 120 and receives modification to the stored metadata. The user interface module 226 also generates a user interface identifying stored video data associated with a user that is retrieved from the data store 120, expediting the user's review of previously stored video data. Additionally, the user interface module 226 generates a user interface for receiving user input to upload video data from a user device 120 to the data store 120 to facilitate publication of the video data using the CMS 110.

The routing module 227 is software and routines executable by the processor 206 for identifying a destination for data received by the content management system (CMS) 110 or processed by the CMS 110. After the routing module 227 determines the destination, the communication device 230 transmits the data to the determined destination using the bus 204 and/or the communication device 230. In one embodiment, the routing module 227 includes a routing table associating destinations with different types of data and/or with different commands. For example, the routing module 227 determines that editing commands from the data editing module 221 are routed to the data store 120 and determines that search commands from the video search module 222 are routed to the data store 120. As additional examples, the routing module 227 determines that data from the user interface module 226 is directed to a user device 160 or determines that website usage data or video access data is transmitted to the analytics server 123.

The media player configuration module 228 is software and routines executable by the processor 206 for generating data to configure a media player 115 to present video data on a user device 160. In one embodiment, the media player configuration module 228 generates embed code for generation and execution of a media player 115 by a user device 160. Alternatively, the media player configuration module 228 generates a media player 115, or a media player configuration, that is communicated from the CMS 110 to a user device 160 via the network. For example, the media player configuration module 228 generates a Hypertext Markup Language version 5 (HTML5) media player. The embed code or media player 115 generated by the media player configuration module 228 is included in a web page so that when a user device 160 accesses the web page, the embed code or other data is executed by the user device 160 to generate a media player 115 that presents video data on the user device 160. While conventional techniques for distributing video data rely on media players 115 having a pre-defined appearance and size, the media player configuration module 228 enables customization of media player 115 appearance. For example, the media player configuration module 228 allows a user to customize a skin displayed with the media player 115. Hence, the media player configuration module 228 allows generation of a media player 115 that is not associated with a destination site 170. For example, the media player configuration module 228 generates a media player 115 without an identifier of a destination site 170 used to distribute the video data and/or a media player 115 including visual data determined from user-supplied data stored by the media player configuration module 228 or by the data store 120.

Additional customizations of the media player 115 are enabled by the media player customization module 228. For example, the media player configuration module 228 allows application of domain restrictions or geographic restrictions to the media player 115 to limit domains in which the media player is able to present video data or to limit geographic regions in which the media player is able to present video data, respectively. In one embodiment, the media player configuration module 228 stores a blacklist identifying domains or geographic regions in which the media player 115 is unable to present video data. Alternatively, the media player configuration module 228 stores a whitelist identifying domains or geographic regions in which the media player 115 is able to present video data. In other embodiments, the media player configuration module 228 includes both a whitelist and a blacklist of domains or geographic regions for limiting presentation of video data by the media player 115.

The operations manager 229 is software and routines executable by the processor 206 for generating modifications to metadata stored in the data store 120 and schedules modification of the stored metadata. Additionally, the operations manager 229 determines when data stored by the data store 120 is changed and notifies the CMS 110 when stored data has been changed using the communication device 230 and/or the network 150 or another connection to the data store 120. In one embodiment, the operations manager 229 maintains one or more queues for scheduling modification of stored metadata or communicating new metadata to the data store 120. The operations manager 229 also communicates changes to stored metadata to one or more destination sites 170 via the communication device 230 and the network 150, allowing a destination site 170 to receive the most current metadata. In one embodiment, the operations manager 229 generates a queue or other schedule specifying the timing of communication of metadata to one or more destination sites 170.

Data Editing Module 221

Figure 3:
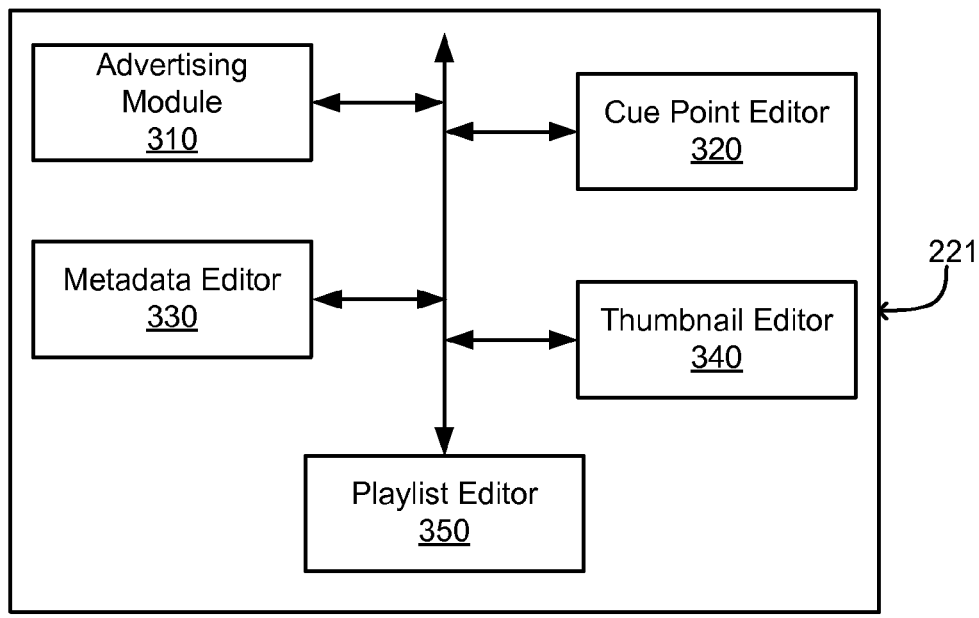
FIG. 3 is a block diagram of one embodiment of a data editing module in accordance with an embodiment.

FIG. 3 is a block diagram of one embodiment of a data editing module 221. The data editing module 221 provides logic and instructions for modifying metadata and/or video data stored in the data store 120. In an embodiment, the data editing module 221 can be implemented in hardware (e.g., in an FPGA). In another embodiment, the data editing module 221 can include software routines and instructions that are stored, for example, in memory and/or in a storage device and executable by a processor to cause the processor to capture and analyze interactions with video data and interactions with web pages used to present the video data. In either embodiment, the data editing module 221 is adapted for cooperation and communication other components of the content management module 201.

In one embodiment, as illustrated in FIG. 3, the data editing module 221 includes an advertising module 310, a cue point editor 320, a metadata editor 330, a thumbnail editor 340 and a playlist editor 350. However, in other embodiments, the data editing module 221 includes different and/or additional modules than the ones depicted in FIG. 3.

In one embodiment, the modules are implemented using instructions and/or data included in a storage device, in another embodiment, the modules are implemented using one or more hardware devices configured to provide the functionality further described below. For example, the modules are implemented using one or more application specific integrated circuits (ASICs) and/or one or more field programmable gate arrays (FPGAs) coupled configured to provide the functionality of the modules further described below.

The advertising module 310 is software and routines executable by a processor for associating one or more advertising servers (ad servers) 140 with video data. In one embodiment, the advertising module 310 includes data identifying one or more ad servers 140 that is displayed by the user interface module 226. The advertising module 310 also includes data for communicating with the ad servers 140, such as uniform resource indicators (URIs) associated with the ad servers 140 and data describing a format for communicating metadata associated with video data to one or more ad servers 140. In one embodiment, the advertising module 310 also includes credentials for a user to access an ad server 140 to simplify user access to an ad server 140. For example, the advertising module 310 includes a publisher identifier associated with a user by an ad server 140. By including data for communicating with ad servers 140, the advertising module 310 allows a user of the CMS 110 to communicate with an ad server 140 using the data stored by the advertising module 310 rather than having the user enter the URI or other data identifying the ad server 140. When the CMS 110 receives data from a user device 160 associating an ad server 140 with video content, the CMS 110 retrieves metadata associated with the video data from the data store 120 and communicates the metadata to the ad server 140.

By receiving metadata associated with video data from the CMS 110, a user is able to modify advertisements identified by the ad server 140 for presentation in conjunction with the video data using the metadata. In one embodiment, the advertising module 310 associates one or more ad servers 140 with different video data associated with a user. This allows a user to specify one or more ad servers 140 for providing advertisements in conjunction with various video data that is associated with the user. Additionally, the advertising module 310 associates one or more ad servers 140 with individual video data, providing a user with increased control over the source of advertisements that are presented with different video data.

In one embodiment, the advertising module 310 maintains an order in which different ad servers 140 are accessed. For example, data received from the communication device 230 includes a user's preferences for ad server 140 access. Alternatively, the advertising module 310 automatically determines an order in which ad servers 140 are accessed. For example, the advertising module 310 determines an order in which ad servers 140 are accessed based on revenue generated from prior advertisements provided by different ad servers 140. In another embodiment, the advertising module 310 receives data from a user identifying one or more criteria and determines an order in which ad servers 140 are accessed based on the user-provided criteria. The advertising module 310 may dynamically modify the order in which ad servers 140 are accessed based on data from the advertising module 310, such as revenue generated by different ad servers 140.

The advertising module 310 and the operations manager 229 allow changes to metadata associated with video data to be dynamically pushed from the data store 120 or the CMS 110 to one or more ad servers 140. Automating communication of modified metadata to an ad server 140 allows the advertising module 310 and the operations manager 229 to reduce the time needed to integrate metadata associated with video data with the ad server 140. This allows an ad server 140 to identify advertisements more closely matching the video data based on the modifications to the metadata. For example, if the operations manager 229 identifies changes to keywords associated with video data, the changed keywords are automatically communicated to the ad server 140, allowing selection of advertisements using the changed keywords. This allows advertisements more closely related to the changed keywords to be presented in conjunction with the video data.

In one embodiment, the advertising module 310 includes a mapping table associated with an ad server 140. The mapping table associates metadata from the CMS 110 with metadata, or data, used by the ad server 140 to expedite use of metadata from the data store 120 by the ad server 140. In one embodiment, user manually generates the mapping table to convert metadata from the data store 120 to data used by the ad server 140. In another embodiment, the ad server 140 includes the mapping table converting metadata received from the data store 120 to data used by the ad server 140, so a user interacts with the ad server 140 to generate the mapping table for metadata conversion.

The cue point editor 320 is software and routines executable by a processor for identifying locations within video data where supplemental content, such as advertisements, are displayed. For example, the cue point editor 320 receives data specifying a start time and an end time of a cue point. Supplemental content, such as one or more advertisements, is presented by a media player 115 in place of the video data during the interval between the start time and the end time. Alternatively, the cue point editor 320 receives a start time and a duration for the cue point. After the end time or after a specified duration, the media player 115 resumes presentation of the video data. Thus, the cue point editor 320 allows customization of the placement of ads or other supplemental content within video data. In one embodiment, the cue point editor 320 and the user interface module 226 allow a user to identify cue points within video data using an interface, such as the one further described below in conjunction with FIG. 10, or using a similar user interface.

The metadata editor 330 is software and routines executable by a processor for displaying metadata associated with video data and/or modifies metadata associated with video data. In one embodiment, the metadata editor 330 receives data from the communication device 230 and/or obtains data from the user interface module 226 and identifies metadata using the received or obtained data. For example, the metadata editor 330 retrieves metadata matching, or similar to, the received or obtained data. Responsive to receiving data changing metadata stored by the data store 120, the metadata editor 330 generates an instruction identifying the metadata to be modified and the modification. For example, a generated instruction identifies a user modifying the metadata, the video data associated with the metadata and the modified metadata. The generated instruction is then transmitted by the communication device 230 to the data store 120 to modify the stored metadata. In addition to modifying stored metadata associated with video data, the metadata editor 330 receives new metadata and communicates the new metadata to the data store 120 for storage and association with video data.

In one embodiment, the data store 120 associates a type with the stored metadata. Examples of metadata types include a video title, a description of the video data, keywords or tags associated with the video data or a label associated with the video data. In one embodiment, the metadata editor 330 allows user definition of custom metadata and values or data types associated with the user-defined metadata. Additionally, the metadata editor 330 allows a user to associate rules and/or permissions with stored video data to limit the ability of other users to access or modify stored video data or metadata associated with stored video data.

The thumbnail editor 340 is software and routines executable by a processor for modifying a thumbnail image associated with stored video data. The thumbnail image associated with video data is displayed by a user device 160 to identify the video data. Responsive to an interaction with the thumbnail image, such as an input received by a user device, the video data is played by a media player 115. In one embodiment, the thumbnail editor 340 receives input identifying an image as the thumbnail image associated with the video data. In one embodiment, the thumbnail editor 340 receives input identifying a frame from the video data and specifies the identified frame as the thumbnail image. The thumbnail editor 340 may also receive data identifying multiple images, such as multiple frames from the video data, and data describing use of different identified images as the thumbnail image associated with the video data. For example, the thumbnail editor 340 modifies the thumbnail image associated with the video data based on timing data, to change the thumbnail image at specified time intervals. As another example, domain information identifies the frame used as the thumbnail image based on the destination site 170 storing the video data for user device 160 access, allowing different destination sites 170 to use different thumbnail images.

In one embodiment, the thumbnail editor 340 performs thumbnail image comparison using analytical data received from the web analytics engine 125, allowing identification of a thumbnail resulting in the largest number of times video data is accessed by media players 115 on user devices 160. For example, a user identifies a set of images, such as a set of frames from the video data, and the thumbnail editor 340 selects a first image from the set as the thumbnail image associated with the video data. While the first image is displayed as the thumbnail image, the thumbnail editor 340 receives data from the analytics engine 125 via the network 150 describing video data access when the first image is displayed. For example, the thumbnail editor 340 receives a number of times the video data has been accessed.

After a specified time interval, the thumbnail editor 340 selects a second image from the set for display as the thumbnail image and receives data from the analytics engine 125 via the network 150 describing video accesses when the second image is displayed. After a specified time interval displaying the second frame, the thumbnail editor 340 presents the video access data, or other analytic data, associated with the first thumbnail and the second thumbnail to the user via the user interface module 226. The user is then able to review the video access data, or other analytic data, when associating a thumbnail image with the video data.

Figure 12:
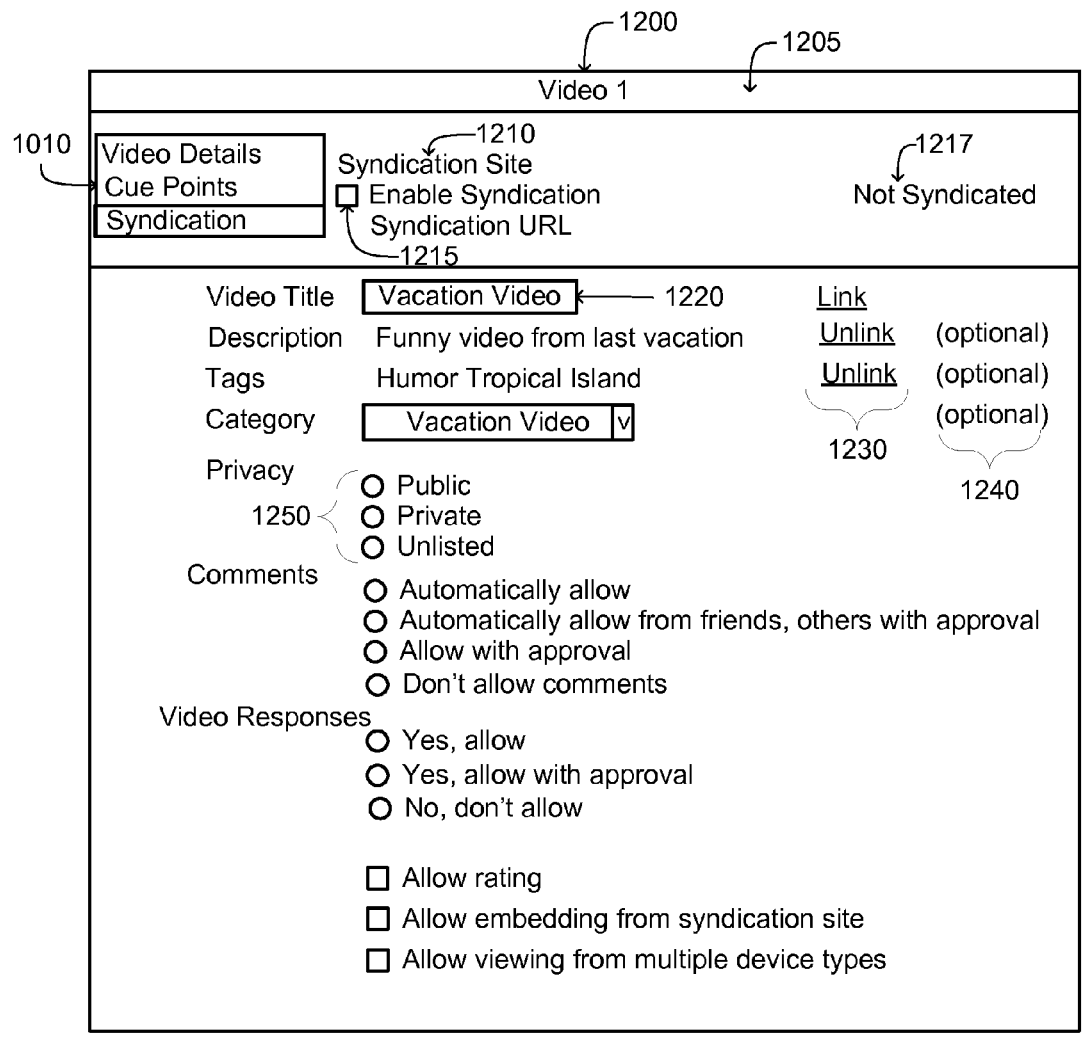
FIG. 12 is an example user interface for viewing and editing syndication data associated with video data in accordance with an embodiment.

The playlist editor 350 is software and routines executable by a processor for generating a playlist including video data. The playlist editor 350 also modifies attributes associated with a playlist, such as playlist title, a description of the playlist tags or keywords associated with the playlist, a delay between presentation of video data included in the playlist, an order in which video data is played in the playlist or other playlist attributes. In one embodiment, user input is received identifying video data included in the playlist and the order in which video data is presented in the playlist. FIG. 12 illustrates an example user interface generated by the user interface module 226 for manual generation or modification of a playlist by the playlist editor 350 as described above.

Figure 13:
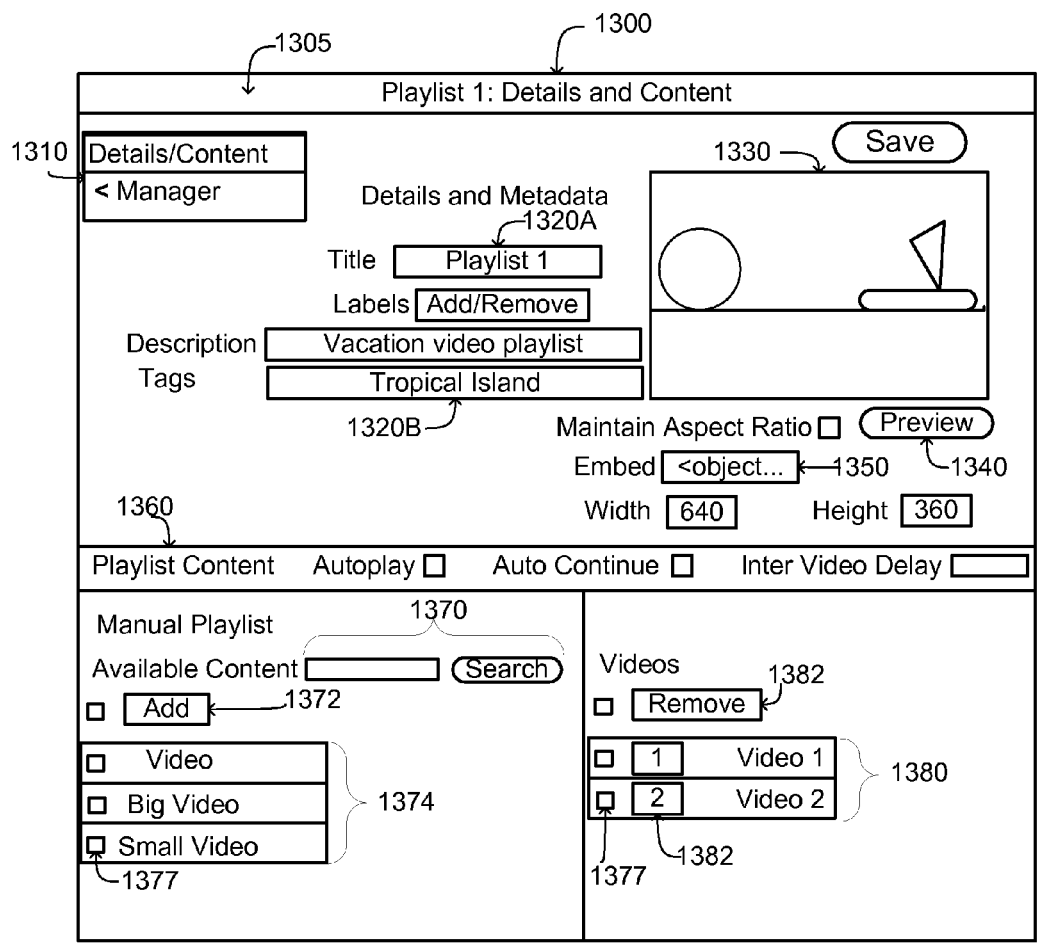
FIG. 13 is an example user interface for manual generation or modification of a playlist including video data in accordance with an embodiment.

In an embodiment, the playlist editor 350 allows dynamic generation of a playlist responsive to input received via the communication module 230 or retrieved from the user interface module 226. For example, the playlist editor 350 receives keywords and/or tags and communicates the keywords and/or tags to the data store 120. Video data associated with metadata matching, or similar to, the keywords and/or tags is identified from the data store 120 and communicated to the playlist editor 350 via the network 150, where it is included in a playlist. This allows the playlist editor 350 to dynamically generate a playlist responsive to received metadata, such as tags, keywords, titles or other metadata. For example, the playlist editor 350 automatically includes newly stored video data to a playlist based on tags, keywords, categories or other metadata associated with the newly stored video data, allowing the playlist to be automatically updated with new content. FIG. 13 illustrates an example user interface generated by the user interface module 226 for dynamically generating or modifying a playlist.

Data Store 120

Figure 4:
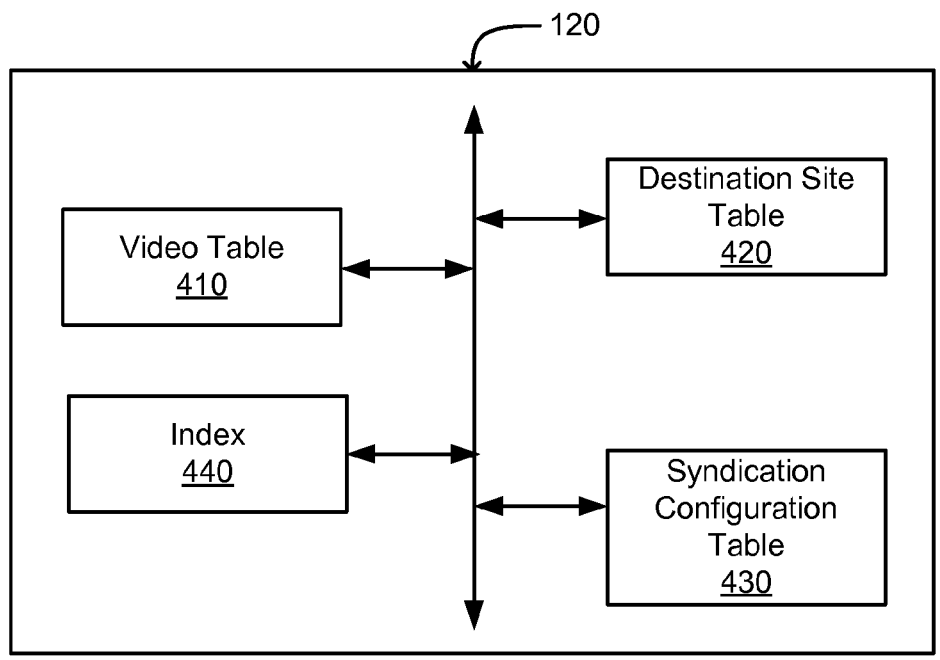
FIG. 4 is a block diagram of one embodiment of a data store in accordance with an embodiment.

FIG. 4 shows a block diagram of one embodiment of a data store 120. Instructions or data stored by the data store 120 are as different functional "modules," in FIG. 4. Different modules identify different instructions and/or data causing the described functionality when executed by a processor (not shown). In one embodiment, the data store includes a video table 410, a destination site table 420, a syndication configuration table 430 and an index 440. However, in other embodiments, the data store 120 includes different and/or additional modules than the ones depicted in FIG. 4.

The video table 410 stores video data and metadata associated with the video data. In an embodiment, the video table 410 includes an entry for different video data and stores metadata associated with the video data in the entry. In one embodiment, an entry in the video table includes video data and metadata associated with the video data. For example, an entry associated with a first video data includes an identifier associated with the first video data, a title associated with the first video data, keywords or tags associated with the first video data, a description of the first video data, copies of the first video data encoded in different formats or any other metadata associated with the first video data.

In an embodiment, an entry in the video table 410 includes metadata or data associated with one or more destination sites 170, to store data used by a destination site 170 to store or distribute video data. For example, an entry in the video table 410 for the first video data includes data expected or used by a destination site 170 when storing or maintaining video data. In one embodiment, the video table 410 includes an identifier for different destination sites 170 to differentiate between data or metadata used by different destination sites 170. For example, the video table 410 organizes data transmitted to various destination sites 170 using a destination site 170 identifier and a user's destination site login.

In one embodiment, the video table 410 also includes a history describing changes to metadata associated with video data. The history includes a record of prior metadata stored in the video table 410 values and identifies prior modifications to metadata. The video table 410 may also include a queue or listing of pending modifications to the metadata. For example, metadata stored in the video table 410 is periodically updated, with a queue of pending metadata changes received from the CMS 110 stored until the modifications are made.

The destination site table 420 identifies data used by one or more destination sites 170 when storing video data. In one embodiment, the data store 120 receives data from a destination site 170 and/or the CMS 110 via the network 150. The received data identifies data fields, allowable data types and required data associated with video data for the destination site 170 to store video data. The destination site table 420 may also include default values for one or more data fields needed by the destination site 170 to expedite dissemination of video data from the data store 120 to a destination site 170.

In one embodiment, the destination site table 420 includes one or more entries, each associated with a destination site 170, identifying data fields, data types or other data associated with a destination site 170. For example, an entry includes a destination site 170 identifier and one or more fields specifying data or restrictions on data used by the destination site 170. In one embodiment, the destination site table 420 associates an integer value with different fields in an entry, allowing identification of the field using the integer value to simplify mapping of metadata from the video table 410 to data field used by a destination site 170.

The syndication configuration table 430 includes user-specified definitions of metadata or data for communication to a destination site 170. For example, the syndication configuration table 430 includes a mapping of metadata stored in the video table 410 to one or more data fields of a destination site 170 included in the destination site table 420. For example, the syndication configuration table 430 maps title metadata from the video table 410 to a title data field and to a description data field associated with a first destination site 170A while mapping title metadata from the video table 410 to a title data field associated with a second destination site 170N and mapping description metadata from the video table 410 to a description data field associated with the second destination site 170N. Mapping metadata from the video table 410 to data fields used by destination sites 170 simplifies distribution of video data by communicating metadata from the video table 410 to the destination sites 170 rather than requiring manual entry of data to multiple destination sites 170. By mapping metadata from the video table 410 to data fields of destination sites 170, a user need only provide metadata once to the CMS 110 and the metadata is used to distribute the video data to one or more destination sites 170.

The syndication configuration table 430 also allows identification of additional metadata augmenting the data fields used by a destination site 170 and identified by the destination site table 420. While the destination site table 420 identifies data fields that the destination site 170 requires prior to storing or distributing video data, the syndication configuration table 420 identifies additional metadata, specified by a user, needed before communicating video data to a destination site 170. Hence, the syndication configuration table 420 enables a user to identify metadata in addition to the data specified in the syndication table 420 that is needed before communicating video data to a destination site 170.

In one embodiment, the syndication configuration table 430 also allows a user to modify the optionality of data fields identified by the destination site table 420. For example, the destination site table 420 identifies data fields associated with a destination site 170 that are optional, based on data from the destination site 170, and the syndication configuration table 430 modifies a data field identified as optional to a required data field. In this example, before communicating video data to the destination site 170, data needs to be supplied for the data field that the syndication configuration table 430 indicates is now required. Hence, the syndication configuration table 430 allows a user to specify receipt of additional data before communicating video data to a destination site 170.

In one embodiment, the data store 120 also includes an index 440 to expedite retrieval of data from the data store 120. For example, the index 440 is a subset of data included in one or more of the video table 410, the destination site table 420 and/or the syndication configuration table 430. The data included in the index 440 identifies entries in the video table 410, the destination site table 420 and/or the syndication configuration table 430, allowing more rapid identification of an entry.

Methods

Figure 5:
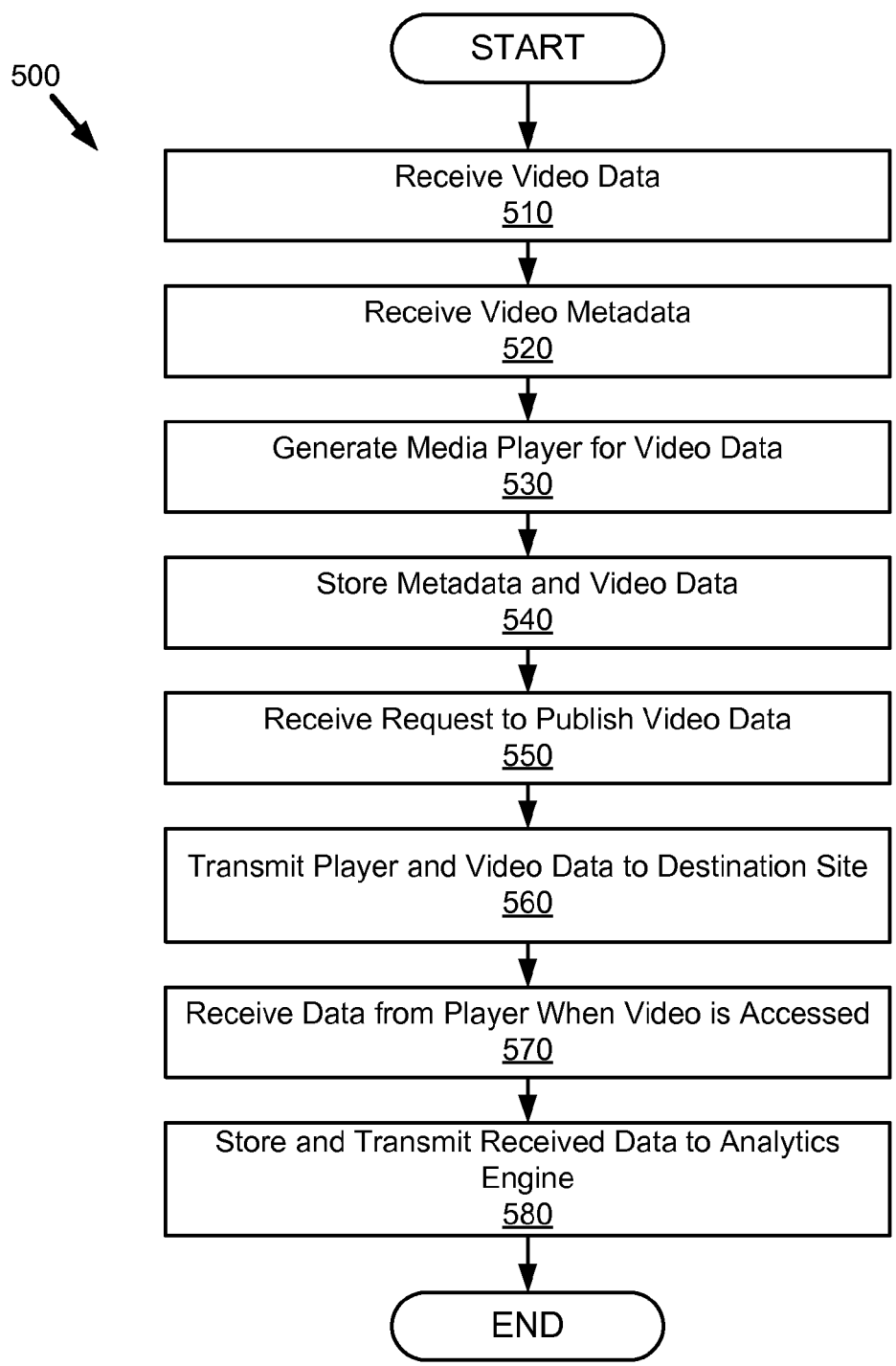
FIG. 5 is a flow chart of one embodiment of a method for managing and distributing video data and associated metadata to a destination site in accordance with an embodiment.

FIG. 5 illustrates a flow chart of one embodiment of a method 500 for managing and publishing video data to a destination site 170 using a content management system (CMS) 110. Initially, the CMS 110 receives 510 video data from a user device 160, or from another source of video data. For example, the CMS 110 receives 510 video data from a network 150 via a communication device 230 included in the CMS 110. In one embodiment, the user interface module 226 of the CMS 110 communicates data to a user device 160 to generate a user interface on the user device 160. Interaction with the generated user interface communicates video data from the user device to the CMS 110.

In one embodiment, after receiving 510 the video data, the CMS 110 receives 520 metadata associated with the video data from the user device 160. For example, the user interface module 226 of the CMS 110 communicates data to the user device 160 generating a user interface on the user device 160 that receives metadata communicated to the CMS 110 by the network 150. The data editing module 221 of the CMS 110 associates the received metadata with the video data and generates instructions for communicating the video data and metadata to the data store 120.

The media player configuration module 228 also generates 530 a media player 115, or media player configuration data, associated with the video data that is subsequently communicated to destination sites 170 for presenting the video data via one or more user devices 160. For example, the media player configuration module 228 generates 530 embed code that generates and implements a media player 115 when executed by a user device 160. Alternatively, the media player configuration module 228 generates 530 a media player 115 that is communicated from the CMS 110, or from the data store 120, to a user device 160 via the network 150, such as a Hypertext Markup Language version 5 (HTML5) media player.

Responsive to determining that video data has been received by the CMS 110 and that the data editing module 210 includes instructions to store data or metadata, the operations manager 229 communicates the video data and associated metadata to the data store 120. The data store 120 stores 540 the video data and associated metadata in the video table 410. Although FIG. 5 illustrates receipt 520 of metadata and generation 530 of a media player prior to storing 540 the video data and associated metadata, in other embodiments metadata is stored 540 in the data store 120 before the media player is generated 530, or metadata is received 520 before video data is received 510.

After the video data and its associated metadata, including the media player 115, are stored in the data store 120, the CMS 110 receives 550 a request to publish the video data to a destination site 170. The request to publish the video data and an identifier associated with the destination site 170 are communicated from the CMS 110 to the data store 120 via the network 150. The CMS 110 compares metadata stored in the video table 410 and associated with the video data to data fields identified in the destination site table 420 and the syndication configuration table 430 to determine whether the video table 410 includes metadata or other data associated with data fields needed by the destination site 170, as specified by the destination site table 420 and/or the syndication configuration table 430. Hence, the CMS 110 verifies that the video table 410 includes metadata, or other data, associated with the video data corresponding to data required by the destination site 170 to store the video data.

For example, if the destination site table 420 or the syndication configuration table 430 indicates that a destination site 170 requires data specifying a video title, a video description and one or more keywords associated with the video data to publish the video data, the CMS 110 determines whether the video table 410 includes metadata, or data, associated with the video title, video description and one or more keywords. In one embodiment, if the video table 410 does not include a subset of the data required by the destination site 170, the user interface module 226 of the CMS 110 alerts the user and presents a notification message using the user device 160 to obtain the additional metadata or data.

If the video table 410 includes metadata, or data, associated with the data fields required by the destination site 170, the CMS 110 transmits 560 the video data from the video table 410 to the destination site 170 via the network 150. In some embodiments, the CMS 110 transmits 560 the media player 115 to the destination site 170 via the network 150. Alternatively, the CMS 110 transmits video data and media player configuration data to the destination site 170 and embeds the video data and media player configuration data into web pages to present video data. For example, the CMS 110 transmits embed code describing operation of the media player 115 and identifying video data presented by the media player 115 and includes the embed code in a web page to the destination site 170. Hence, in one embodiment a destination site 170 communicates with the CMS 110 and uses the CMS 110 to retrieve data and metadata from the data store 120 to present video data to user devices 160. In an alternate embodiment, the CMS 110 communicates a media player 115 video data and metadata from the data store 120 to the destination site 170, allowing the destination site 170 to embed the media player 115 from the CMS 110 into one or more web pages included in the destination site 170 or into one or more web pages included in another destination site 170 associated with the destination site 170 receiving the media player 115 and video data. User devices 160 then access the video data by accessing one or more web pages associated with the destination site 170. In one embodiment, the destination site 170 communicates the media player 115 to a user device 160, which implements the media player 115 to present the video data.

The CMS 110 receives 570 data from the media player 115 when it is implemented by the user device 160, allowing the CMS 110 to receive data describing interaction with the video data by the user device 160. For example, the media player 115 transmits data to the CMS 110 when the media player 115 is loaded by the user device 160, when the media player 115 is used to play video, when the media player 115 presents video data for a specified length of time, when video data presented by the media player 115 pauses video data, when the media player 115 has presents a certain percentage of the video data or other interactions between a user of the user device 160 and the media player 115.

The CMS 110 communicates data received from the media player 115 to the data store 120, which stores 580 and transmits the received data to an analytics engine 125 via the network 150. Using the data from the media player 115, the analytics engine 125 generates data, such as one or more reports, describing access to and/or interaction with the video data. In one embodiment, the analytics engine 125 generates a report describing interaction with a first video data based on data received from media players 115 from multiple destination sites 170A-170N. Alternatively, or additionally, the analytics engine 125 generates a report describing interaction with the first video data using data received from media players 115 from a single destination site 170A, describing access to and/or interaction with the first video data from the single destination site 170A.

Figure 6:
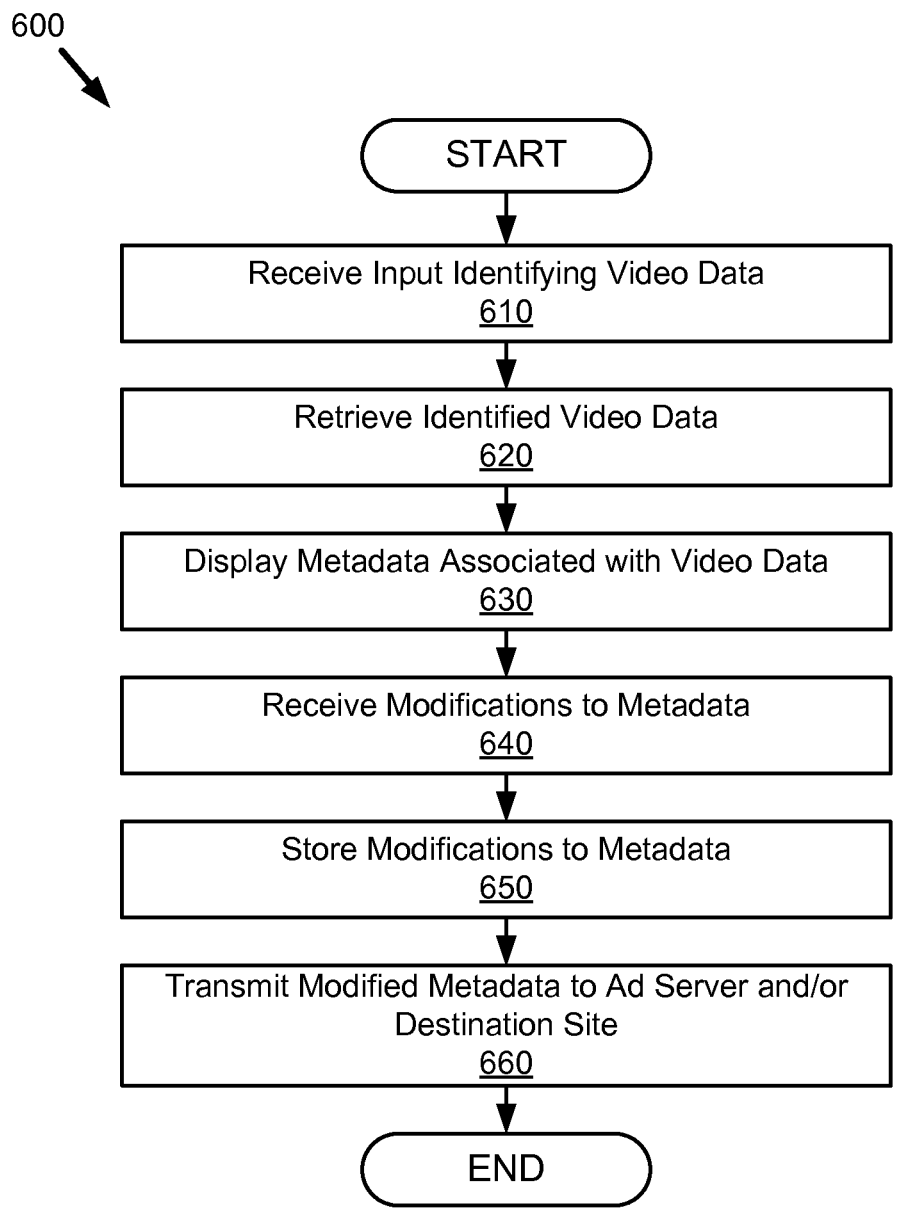
FIG. 6 is a flow chart of one embodiment of a method for modifying stored metadata associated with video data and distribution of the modified metadata in accordance with an embodiment.

FIG. 6 is a flow chart of one embodiment of a method 600 for modifying stored metadata associated with video data and distribution of the modified metadata. A content management system (CMS) 110 receives 610 input identifying video data stored in the video table 410 of the data store 120. For example, a user interface generated on a user device 160 receives input, such as a title, a file name or other suitable data, identifying stored video data. In one embodiment, the received input is one or more search terms for identifying metadata associated with video data. The input is communicated from the user device 160 to the CMS 110 via the network 150, and the CMS 110 retrieves 620 video data from the video table 410 in the data store 120 by identifying metadata in the video table 410 matching, or similar to, the received input. In one embodiment, the data editing module 221 generates data or instructions to retrieve video data using the received input data. For example, the data editing module 221 generates an instruction to retrieve 620 video data associated with metadata matching, or similar to, the received input from the video table 410.

After retrieving 620 video data associated with metadata matching, or similar to, the received input, the user interface module 221 and the metadata editor 330 display 630 the retrieved metadata on the user device 160 by generating a user interface. In one embodiment, a user interface similar to that shown in FIG. 9 displays 630 the metadata. A user interacts with one or more elements of the user interface to modify the displayed metadata. For example, the user selects one or more selection regions or enters alphanumeric data using one or more input regions of the user interface.

Modifications to the retrieved metadata are transmitted from the user device 160 to the CMS 110 via the network 150. The metadata editor 330 receives 640 the modifications to the retrieved metadata and generates one or more instructions identifying the metadata to be modified and the modification, or modifications, to the metadata. For example, the generated instruction identifies a user modifying the metadata, the video data associated with the metadata and the modified value of the metadata. The one or more instructions are then transmitted to the data store 120 by the communication device 230 and the operations manager 229. The modifications to the metadata are stored 650 in the video table 410 of the data store 120.

In one embodiment, the CMS 110 also transmits 660 the modified metadata to an advertisement server (ad server) 140 and/or to a destination site 170. For example, after storing 650 modifications to the metadata in the video table 410, the data store 120 transmits a confirmation message to the CMS 110 and transmits 660 the modified metadata to an ad server 140 or to a destination site 170. This allows the CMS 110 and data store 120 to dynamically push modifications to the metadata to other devices, reducing the time for integrating metadata modifications with other entities that use at least a portion of the metadata in addition to the video data. For example, transmitting 660 modified metadata to an ad server 140 allows the ad server 140 to more quickly modify the advertisements associated with the video data using the modified metadata. Alternatively, the operations manager 229 of the CMS 110 communicates with the data store 120, and responsive to the operations manager 229 determining that metadata stored in the video table 410 is modified, the operations manager 229 and the communication device 230 transmit 660 the modified metadata to an ad server 140 and/or to a destination site 170.

Figure 7:
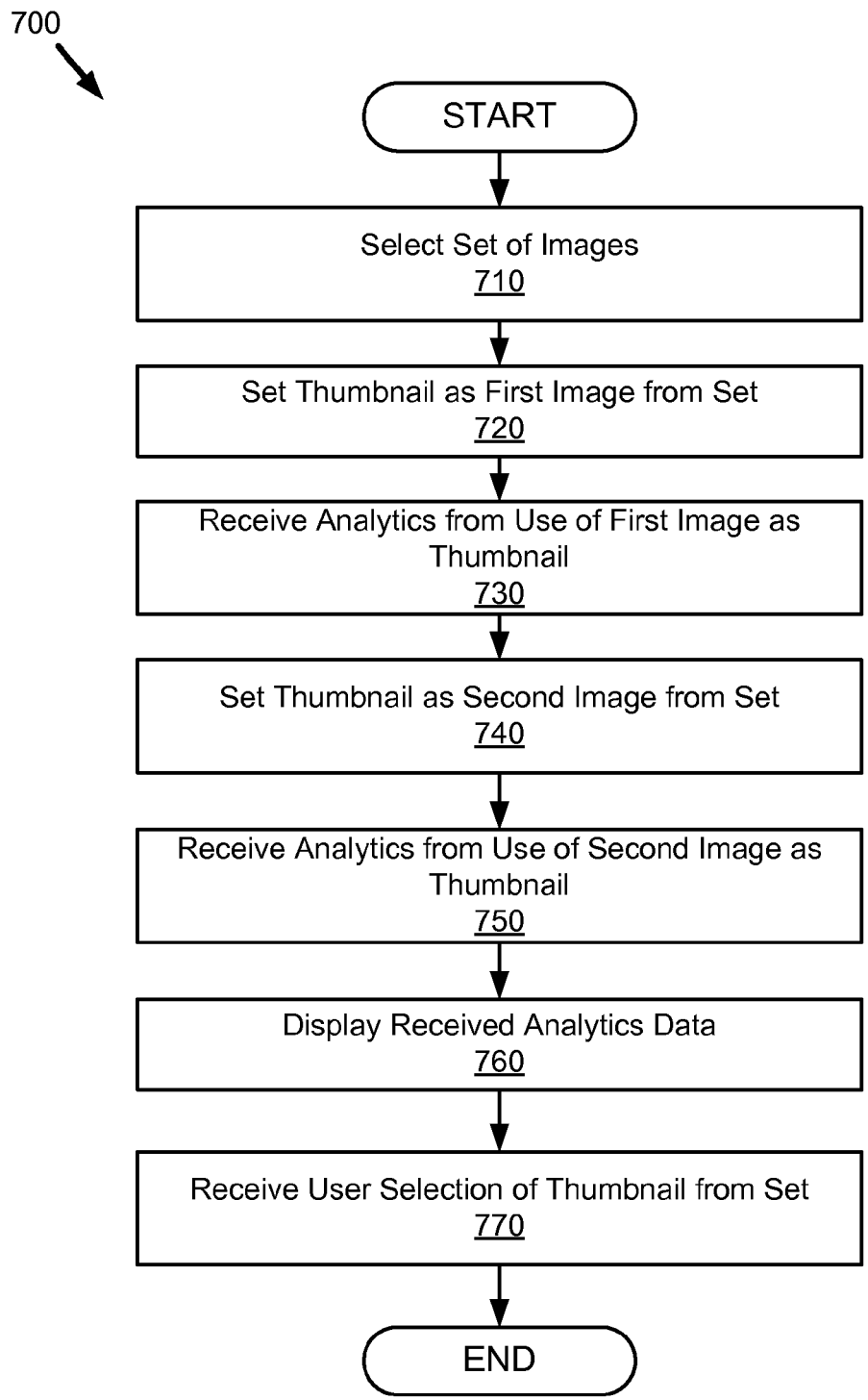
FIG. 7 is a flow chart of a method for selection of a thumbnail image associated with video data in accordance with an embodiment.

FIG. 7 is a flow chart of a method 700 for selecting a thumbnail image associated with video data. The thumbnail editor 340 initially receives input selecting 710 a set of at least two images. For example, the thumbnail editor 340 receives input selecting 710 a set of frames from the video data. The selected images are potential thumbnail images for association with the video data. In one embodiment, the thumbnail editor 340 receives input from a user device 160 via the network 150 selecting 710 images, such as frames from the video data. Alternatively, the thumbnail editor 340 automatically selects 710 a set of frames from the video data using stored criteria and/or stored preferences. For example, the thumbnail editor 340 selects 710 frames from specified times, or at specified percentages, of the video data.

The thumbnail editor 340 then sets 720 a first image from the set as the thumbnail image associated with the video data. For example, the thumbnail editor 340 receives input from a user device 160 identifying the first image and sets 720 the thumbnail image as the first image. As another example, the thumbnail editor 340 uses stored criteria or preferences to identify the first frame and sets 720 the thumbnail image as the first image. As an example, the thumbnail editor 340 receives input identifying a first frame from the video data and sets 720 the thumbnail image as the first frame. After setting 720 the thumbnail image to the first image, the thumbnail image is communicated to one or more destination sites 170 storing the video data. Thus, when a user device 160 accesses a web page hosted by a destination site 170 that includes the video data, the first image is displayed on the user device 160 as the thumbnail image of the video data. User interaction with the first image initiates presentation of the video content by the user device 160.

As users interact with the first image, a media players 115 used to present the associated video data, the media player 115 communicates data to the analytics engine 125 describing one or more interactions with the video data. For example, the analytics engine 125 receives data describing when the media player 115 was loaded by the user device 160, whether the media player 115 is used to present video, the length of time video data is presented by the media player 115, whether video playing in the media player 115 is paused or other interactions with the media player 115. The CMS 110 receives 730 the data from the analytics engine 125, allowing the thumbnail editor 340 to store data describing user interaction with the video data when using the first image as the thumbnail image.

After a specified time interval, or after an event occurs, the thumbnail editor 340 identifies a second image from the set and sets 740 the thumbnail image associated with the video data to the second image. For example, after the analytics engine 125 receives sufficient analytics data to allow evaluation of the effectiveness of the first image and the second image for drawing traffic to the video data associated with the thumbnail image. The CMS 110 then receives 750 data from the analytics engine 125 describing interaction with video content when using the second image as the thumbnail image. In one embodiment, the thumbnail editor 340 identifies an additional image from the set and sets the thumbnail image to the additional image to receive data from media players 115. Data describing interaction with the video content when the additional image is used as the thumbnail image is then received from the analytics engine 125. For example, the thumbnail editor 340 sets the thumbnail image as each of a specified number of images and receives data from the analytics engine 125 when each of the images is used as the thumbnail image.

After receiving 730, 750 data from the analytics engine 125 describing interaction with the video data when multiple images have been used as the thumbnail image, the CMS 110 displays 760 the data from the analytics engine 125. For example, the user interface module 221 generates a user interface on the user device 160 displaying 760 data from the analytics engine 125. The thumbnail editor 340 then receives 770 input selecting the image for use as the thumbnail image. Hence, analytical data describing how different thumbnail images affect user interaction with video data, allowing association of a thumbnail image maximizing access to the video data, or optimizing another criteria, with the video data.

In one embodiment, the thumbnail editor 340 generates different resolutions for the thumbnail image, allowing different formats of the thumbnail image to be used in different situations. For example, the thumbnail editor 340 generates a low-resolution version of the thumbnail image, a medium-resolution version of the thumbnail image and a high-resolution version of the thumbnail image. Responsive to user input, the thumbnail editor 340 identifies a resolution of the thumbnail image that is communicated to a web page. For example, a user identifies the low-resolution version of the thumbnail image for display on a search result web page and identifies a high-resolution version of the thumbnail image for display on a web page including details about the specific video data.

Figure 8:
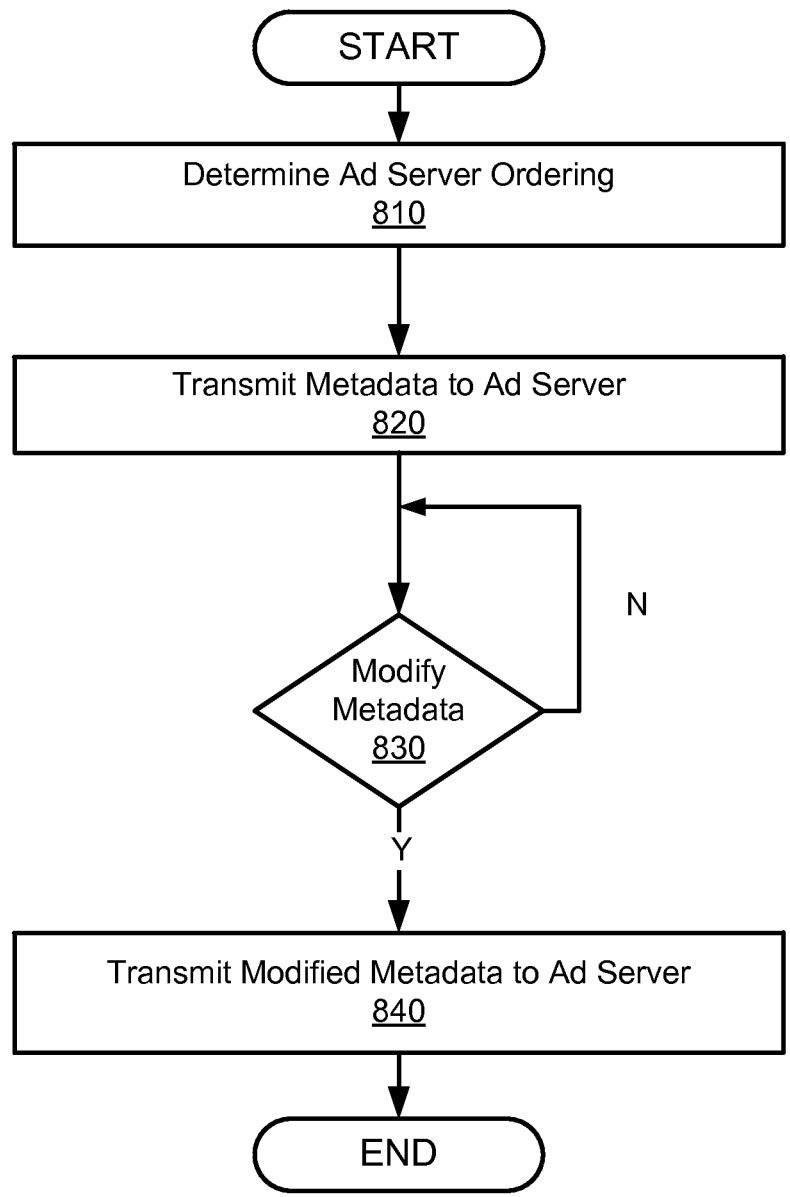
FIG. 8 is a flow chart of one embodiment of a method for communicating metadata associated with video data to an advertising server in accordance with an embodiment.

FIG. 8 is a flow chart of a method 800 for communicating metadata from the content management system (CMS) 110 to an advertising server (ad server) 140. In one embodiment, the advertising module 310 determines 810 an order in which ad servers 140 are accessed for supplemental content, such as advertisements. In one embodiment, the ad server 140 ordering is determined 810 by user input received via the network 150. Alternatively, the advertising module 310 automatically determines 810 the order in which ad servers 140 are accessed. For example, the advertising module 310 determines 810 an order for ad server 140 access based on revenue previously generated by advertisements provided by different ad servers 140. In another embodiment, the advertising module 310 receives data from a user identifying one or more criteria and determines 810 the order in which ad servers 140 are accessed using the user-provided criteria. The advertising module 310 may dynamically modify the order in which ad servers 140 are accessed based on data received from the advertising module 310, such as revenue generated by different ad servers 140.

The advertising module 310 and the operations manager 229 identify metadata from the video table 410 and transmit 820 the metadata to the one or more ad servers 140 via the communication device 230 and the network 150. At least a subset of the metadata describes the content of the video data. For example, the metadata includes keywords associated with the video data that describe the subject matter of the video data. After transmitting 820 the metadata, the operations manager 229 monitors the metadata to determine 830 whether at least a subset of the metadata is modified. Responsive to determining 830 that the metadata is not modified, the operations manager 229 continues to monitor the metadata for modifications.

Responsive to determining 830 a modification to a subset of the metadata, the operations manager 229 identifies the modifications to the metadata. In one embodiment, the operations manager 229 identifies instructions for modifying metadata from the metadata editor 330, and determines 830 that metadata is modified based on identification of the instructions. The operations manager 229 then communicates the modified metadata to the communication device 230, which transmits 840 the modified metadata to the one or more ad servers 140.

Hence, modifications to metadata associated with video data are dynamically pushed from the data store 120 or the CMS 110 to one or more ad servers 140, reducing the time for integrating metadata associated with video data with the ad server 140. This allows an ad server 140 to select advertisements that more accurately reflect the modified metadata, making the advertisements more relevant to the content specified by the metadata. For example, if the operations manager 229 indicates that a keyword associated with video content is modified from "drama" to "action," the modified keywords are automatically transmitted 840 to the ad server 140, allowing the ad server 140 to select advertisements using the keyword "action." This allows selection of advertisements more closely related to the "action" keyword rather than the "drama" keyword. In one embodiment, the ad server 140 maps the received metadata to data used by the ad server 140 to select advertisements.

Example User Interfaces

FIGS. 9-14 depict example user interfaces used by the content management system (CMS) 110. In one embodiment, the user interface module 226 includes data that, when executed by a processor, generates one or more of user interfaces described in conjunction with FIGS. 9-14, or similar user interfaces. For example, the CMS 110 communicates data from the user interface module 226 to a user device 160, where a processor executes the data to generate a user interface.

Figure 9:
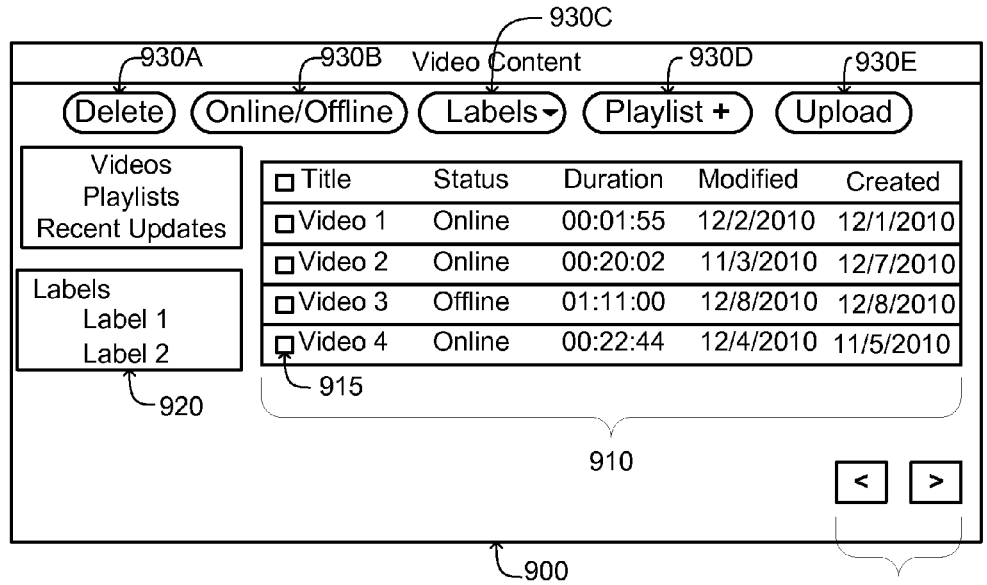
FIG. 9 is an example user interface for managing video data using the content management system in accordance with an embodiment.

FIG. 9 is an example of user interface 900 for video data management using the content management system (CMS) 110. The example user interface 900 displays metadata associated with video data stored in the data store 120 using a video data summary 910. In the example of FIG. 9, the video data summary 910 includes a plurality of rows, with each row including data associated with video data. For example, a row of the video data displays a title of video data, whether the video data is accessible via one or more destination sites 170, the duration of the video data, the date when metadata associated with the video data was modified and the date when the video data was created or uploaded to the CMS 110. In other embodiments, however, the video data summary 910 includes different and/or additional data than the above-identified examples.

Additionally, rows of the video data summary 910 include a video data selector 915 for receiving input selecting video data for which additional metadata is presented or metadata is modified. In one embodiment, the video data selector 915 is a check box or other input mechanism that receives and maintains binary data indicating selection of video data. Navigation buttons 940 allow modification of the video data displayed by the video data summary 910. For example, the navigation buttons 940 allow viewing of multiple displays that include different video data in the video data summary 910.

The user interface 900 also includes a plurality of action regions, such as buttons that perform a specified action responsive to receiving an input. In the example of FIG. 9, the user interface 900 includes a delete button 930A, an online modification button 930B, a label application button 930C, a playlist addition button 930D and an upload button 940E. However, in other embodiments, the user interface 900 may include different and/or additional action regions.

Responsive to receiving a user interaction with the delete button 930A, the CMS 110 identifies video data associated with a video data selector 915 identifying selected video data and removes the selected video data from the data store 120. Receiving a user interaction with the online modification button 930B causes the CMS 110 to modify whether selected video data is accessible to user devices 160 via a destination site 170. For example, if selected video data is accessible via a destination site 170, interaction with the online modification button 930 makes selected video data inaccessible via the destination site 170. Similarly, if selected video data is not accessible via a destination site 170, interaction with the online modification button 930 makes the selected video data accessible via the destination site 170.

User interaction with the label application button 930C associates a label with selected video data. For example, interaction with the label application button 930C displays a listing of current labels, allowing a user to select a label that is associated with selected video data or to generate a new label for association with selected video data. In one embodiment, a label navigation menu 920 identifies existing labels and receives input modifying the video data summary 910 to display video data associated with a specific label. Associating labels with video data and grouping video data using labels allows the CMS 110 to simplify retrieval of video data. While conventional methods require traversal of a directory structure, or other hierarchical structure, to locate video data, the CMS 110 retrieves video data based on an identified label associated with the video data. Hence, fewer inputs are needed to retrieve video data stored using the CMS 110 and the data store 120.

Interaction with the playlist addition button 930D adds video data selected by a video data selector 915 to a playlist. For example, interaction with the playlist addition button 930D presents a listing, such as a drop-down menu, of existing playlists, allowing identification of a playlist to which the selected video data is added. In one embodiment, interaction with the playlist addition button 930D displays a user interface, such as the ones described below in conjunction with FIGS. 13 and 14 to modify a playlist. Interaction with the upload button 930E prompts a user to identify video data to be uploaded to the CMS 110 and stored in the data store 120.

Figure 10:
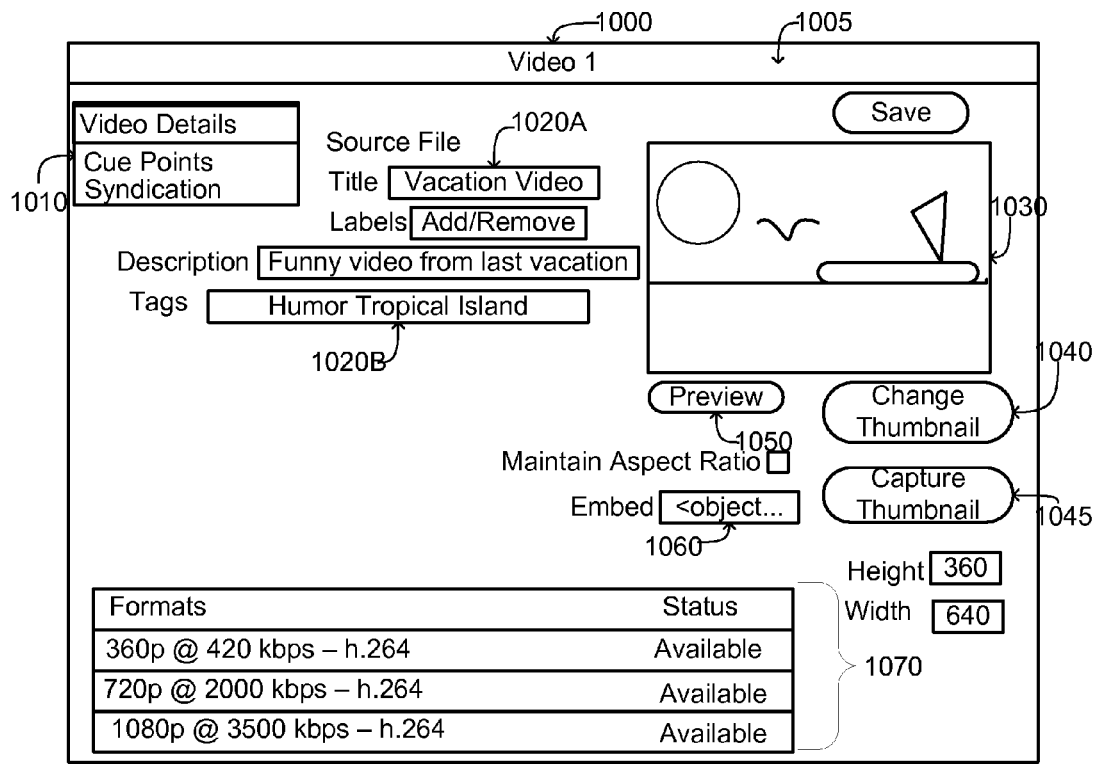
FIG. 10 is an example user interface for viewing and editing metadata associated with video data in accordance with an embodiment.

FIG. 10 is an example user interface 1000 for viewing and editing metadata associated with video data stored by the data store 120. The user interface 1000 includes a navigation menu 1010 receiving input to display different user interfaces. In the example of FIG. 10, the navigation menu 1010 allows display of user interfaces associated with "Video Details," "Cue Points," and "Syndication." In an embodiment, the navigation menu 1010 visually distinguishes the currently displayed user interface 1000 from other user interfaces. For example, the navigation menu 1010 changes the font color, font format, background color or other formatting associated with the currently displayed user interface 1000.

The user interface 1000 displays a video data identifier 1005, such as the title of the video data or the filename of the video data, to specify the video data whose metadata is being viewed. In the example of FIG. 10, metadata associated with "Video 1" is shown in the metadata entry regions 1020A, 1020B. In one embodiment, an identifier or tag is displayed proximate to a metadata entry region 1020A, 1020B to identify a type or a name associated with the metadata. In one embodiment, the metadata entry regions 1020A, 1020B are text entry boxes or other input mechanisms for receiving data, such as alphanumeric data.

For example, metadata stored in the video table 410 is associated with a tag to simplify maintenance and retrieval of different types of metadata. The descriptive text shown in FIG. 10 proximate to the metadata entry regions 1020A, 1020B identifies how the video table stores, or classifies, received metadata. For example, in FIG. 10 metadata entry region 1020A receives metadata stored as a "Title" type while metadata entry region 1020B receives metadata stored as a "Tags" type, such as keywords associated with the video data.

The user interface 1000 also includes a thumbnail image 1030 associated with the video data that displayed by a user device 160 when accessing a web page including the video data. Interaction with a thumbnail modification button 1040 and/or a thumbnail capture button 1045 allows modification of the thumbnail image associated with the video data. Responsive to an input, the thumbnail modification button 1040 presents video data using a media player 115 and a subsequent interaction with the media player 115 or with the thumbnail capture button 1045 captures a frame from the video data. The captured frame is set as the new thumbnail image associated with the video data or is stored in the video table 410 for subsequent selection as a thumbnail image by the thumbnail editor 340. Similarly, a preview button 1050 presents the video data stored by the data store 120 in a media player 115 responsive receiving an input.

A media player identifier 1060 presents embed code, or other media player configuration data, associated with the video data. Displaying the media player configuration data allows replication of the media player 115 in another location by copying the media player configuration data. In one embodiment, the user interface 1000 includes a format listing 1070 identifying different copies of the video data generated from application of one or more codes by the transcoding module 225. The format listing 1070 may also identify whether copies of the video data encoded by different codecs are available for communication to a destination site 170.

Figure 11:
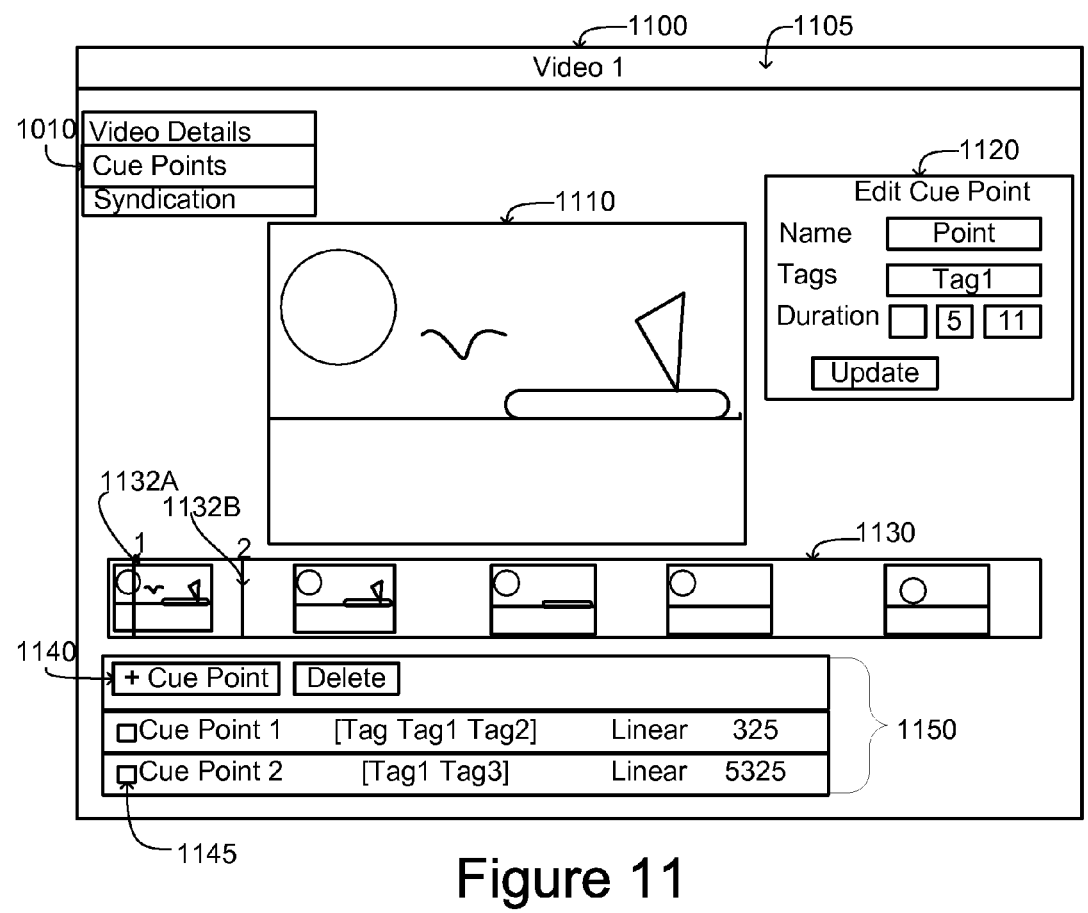
FIG. 11 is an example user interface for identifying cue points for insertion of supplemental data into video data in accordance with an embodiment.

FIG. 11 is an example user interface 1100 for identifying cue points within video data for insertion of supplemental data into the video data. In one embodiment, the user interface module 226 and the cue point editor 320 include data that is executed by a processor to generate the user interface 1100, which receives input identifying temporal locations within video data where supplemental content, such as advertisements, is presented in place of the video data.

The user interface 1100 includes the navigation menu 1010, as described above in conjunction with FIG. 10, to allow selection of different user interfaces. The user interface 1100 also displays a video data identifier 1105, such as the title of the video data or the filename of the video data, specifying the video data for which cue points are identified. A media player 1110 is used to present the video data.

A cue point editor 1120 receives data describing attributes of a cue point. For example, the cue point editor 1120 receives data specifying a title, one or more tags and a duration associated with a cue point. The one or more tags allow an ad server 140 to customize the supplemental content presented during the cue point to have similar subject matter than that identified by the tags. For example, associating a tag of "sports" with a cue point causes an ad server 140 to present advertisements relating to sports during the cue point. The cue point editor 1120 also allows a user to specify the duration of a cue point.

A video overview interface 1130 provides a temporal overview of the video data, providing a timeline of the video data. In one embodiment, the video overview interface 1130 shows a subset of frames from the video data along a timeline, presenting different frames according to the temporal order of the frames relative to each other. In the example of FIG. 11, the leftmost portion of the video overview interface 1130 represents the start of the video data and the rightmost portion of the video overview interface 1130 represents the end of the video data. For example, FIG. 11 shows frames in the video overview interface 1130 from left to right to visually represent changes in the video content over time.

The video overview interface 1130 also displays cue point positions 1132A, 1132B indicating times within the video data when cue points start. In the example of FIG. 11, two cue points are identified by cue point positions 1132A, 1132B. In one embodiment, the cue point positions 1132A, 1132B are overlaid on frames from the video data shown by the video overview interface 1130, simplifying identification of the cue points within the video data by examining the video overview interface 1130.

A cue point addition button 1140, or other input mechanism, receives data for generating a new cue point. In one embodiment, a user selects a location within the video overview interface 1130 and accesses the cue point addition button 1140 to insert a cue point starting at the accessed location into the video data. Attributes of the cure point are specified using the cue point editor 1120. Alternatively, the cue point addition button 1140 is accessed, and a location for the cue point within the video data is specified by accessing a location within the video overview interface 130.

A cue point summary 1150 identifies cue points associated with the video data. For example, the cue point summary 1150 presents multiple rows of data, with each row presenting data about a single cue point. In the example of FIG. 11, a row of the cue point summary 1150 displays a name associated with a cue point, tags associated with the cue point and the duration of the cue point. In one embodiment, a cue point selector 1145, such as a check box or other input mechanism for receiving data, is also included in a row, allowing selection of a cue point for editing or deletion.

FIG. 12 is an example of a user interface 1200 for viewing and editing syndication data associated with video data included in the data store 120. As used herein "syndication data" refers to data that is communicated to a destination site 170 to allow storage of video data by the destination site 170. The user interface 1200 includes a navigation menu 910, further described above in conjunction with FIG. 10, to allow selection of different user interfaces. The user interface 1200 displays a video data identifier 1205, such as the title of the video data or the filename of the video data, to identify the video data whose syndication data is being viewed and/or edited. In the example of FIG. 12, syndication data associated with "Video 1" is displayed.

As different destination sites 170 may receive different syndication data, a destination site 1210 identifier is displayed. In one embodiment, the destination site identifier 1210 is a name associated with a destination site 170, a uniform resource indicator (URI) associated with a destination site 170, a combination of a name and a URI associated with a destination site 170 or any other identifier associated with a destination site 170. A syndication enablement input 1215 receives input specifying whether or not the identified video data is stored by the identified destination site 170 and accessible to user devices 160 via the identified destination site 170. For example, a first value of the syndication enablement input 1215 causes communication of the video data from the data store 120 to the destination site 170, while a second value of the syndication enablement input 1215 prevents the video data from being transmitted to the identified destination site 170 and/or removes the video data from the identified destination site 170. A syndication status identifier 1217 specifies whether the video data is currently being stored by the identified destination site 170 and user devices 160 are able to access the video data via the identified destination site 170.

Syndication data associated with the identified video data is displayed by the user interface 1200. In one embodiment, the syndication data is presented in groups using from destination site 170 data from the destination site table 420. In the example of FIG. 12, syndication data is presented in groups of "Video Title," "Description," "Tags," "Category," "Privacy," "Comments," and "Video Responses." Metadata or data from the video table 410 is displayed proximate to a group identifier to expedite review and/or editing of the syndication data. For example, in FIG. 12, the destination site 170 receives the data "Vacation Video" for the syndication data "Video Title."

Responsive to an input accessing displayed syndication data, a syndication data editor 1220 is displayed for receiving input modifying the syndication data. Syndication data not being edited is displayed without using the syndication data editor 1220. For example, the syndication data editor 1220 displays syndication data being edited in a text box while syndication data not being edited is displayed as text. The user interface 1200 modifies presentation of syndication data based on a type or attribute of the syndication data. For example, if syndication data has a limited number of permissible values, the values are displayed along with an input mechanism for selecting a value. In the example of FIG. 12, the "Privacy" syndication data has three permissible values, so the user interface 1200 displays the permissible values along with an input mechanism 1250, such as a radio button or check box, for selecting between the permissible values.

The user interface 1200 uses a data type identifier 1240 to indicate whether syndication data is required by the destination site 170 or is optional. In the example of FIG. 12, the data type identifier 1240 displays "(optional)" to denote syndication data that is not required by the destination site 170 and does not display text or graphics to denote syndication data required by the destination site 170. The data type identifier 1240 allows rapid determination of whether the destination site 170 has received, or will receive, the syndication data needed to store and distribute the video data. The data type identifier 1240 also expedites identification of the minimum amount of syndication data needed to communicate video data to a destination site 170.

To further simplify communication of data to a destination site 170, the user interface 1200 includes a metadata linkage input 1230 to link syndication data with metadata associated with the video data. Rather than manually enter syndication data for a destination site 170, the metadata linkage input 1230 allows metadata associated with the video data to be retrieved from the data store 120 and used as the syndication data communicated to the destination site 170. In one embodiment, accessing the metadata linkage input 1230 modifies whether syndication data is linked to metadata associated with the video data. In the example of FIG. 12, the metadata linkage input 1230 indicates that the "Video Title" syndication data is linked to metadata while the "Description" and "Tags" syndication data is not linked to metadata.

FIG. 13 is an example user interface 1300 for manual generation or modification of a playlist including video data stored by the data store 120. The user interface 1300 includes a navigation menu 1310 receiving user input to display different user interfaces. In the example of FIG. 13, the navigation menu 1310 identifies user interfaces associated with "Details/Content" and "Manager." In an embodiment, the navigation menu 1310 visually distinguishes the currently displayed user interface 1300 from other user interfaces. For example, the navigation menu 1310 changes the font color, font format, background color or other formatting associated with the current user interface.

The user interface 13 displays a playlist identifier 1305, such as the title of the playlist. In the example of FIG. 13, data associated with "Playlist 1" is shown in data entry regions 1320A, 1320B. In one embodiment, an identifier or tag is displayed proximate to a data entry region 1320A, 1320B to differentiate between the data entered. In one embodiment, the data entry regions 1320A, 1320B are text entry boxes or other input mechanisms for receiving data, such as alphanumeric data.

A thumbnail image 1330 associated with the playlist is displayed. The thumbnail image 1330 is displayed by a user device 160 when accessing a web page including the playlist. In one embodiment, the thumbnail image 1330 is a frame captured from video data included in the playlist. Responsive to receiving an input, a preview button 1340 allows viewing of the video data included in the playlist using a media player 115.

A media player identifier 1350 includes media player configuration data that is communicated to a destination site 170, such as embed code. Displaying the media player configuration data allows the media player configuration data to be copied to another location to replicate the media player 115. A playlist configuration menu 1360 receives input modifying one or more attributes of the playlist. For example, the playlist configuration menu 1360 receives input specifying whether the playlist automatically begins playing when a web page including the playlist is accessed, whether there is a delay between the different video data included in the playlist or other data describing presentation of video data included in the playlist.

In one embodiment, a search interface 1370 receives input from a user and searches the video table 410 for metadata matching, or similar to, search terms received by the search interface 1370. Search results from the video table 410 are displayed in a content listing 1374. In one embodiment, the content listing 1374 displays identifiers of video data associated with metadata matching, or similar to, the search terms received by the search interface 1370. For example, the content listing 1374 displays multiple rows, with a video identifier included in each row. Additionally, the content listing 1374 displays a video data selector 1377 proximate to a video identifier for receiving input selecting video data. In one embodiment, the video data selector 1377 is a check box or other input mechanism receiving and storing binary data indicating selection of video data. Accessing a playlist addition button 1372 inserts selected video data into the playlist.

A playlist summary 1380 displays the video data currently included in a playlist. In one embodiment, the playlist summary 1380 identifies video data included in the playlist and a playlist order 1382 indicating the order in which video data is presented in the playlist. The playlist summary 1380 also includes a video data selector 1377, allowing a selection of video data included in the playlist. Additionally, a delete button 1382 allows removal of selected video data form the playlist.

Figure 14:
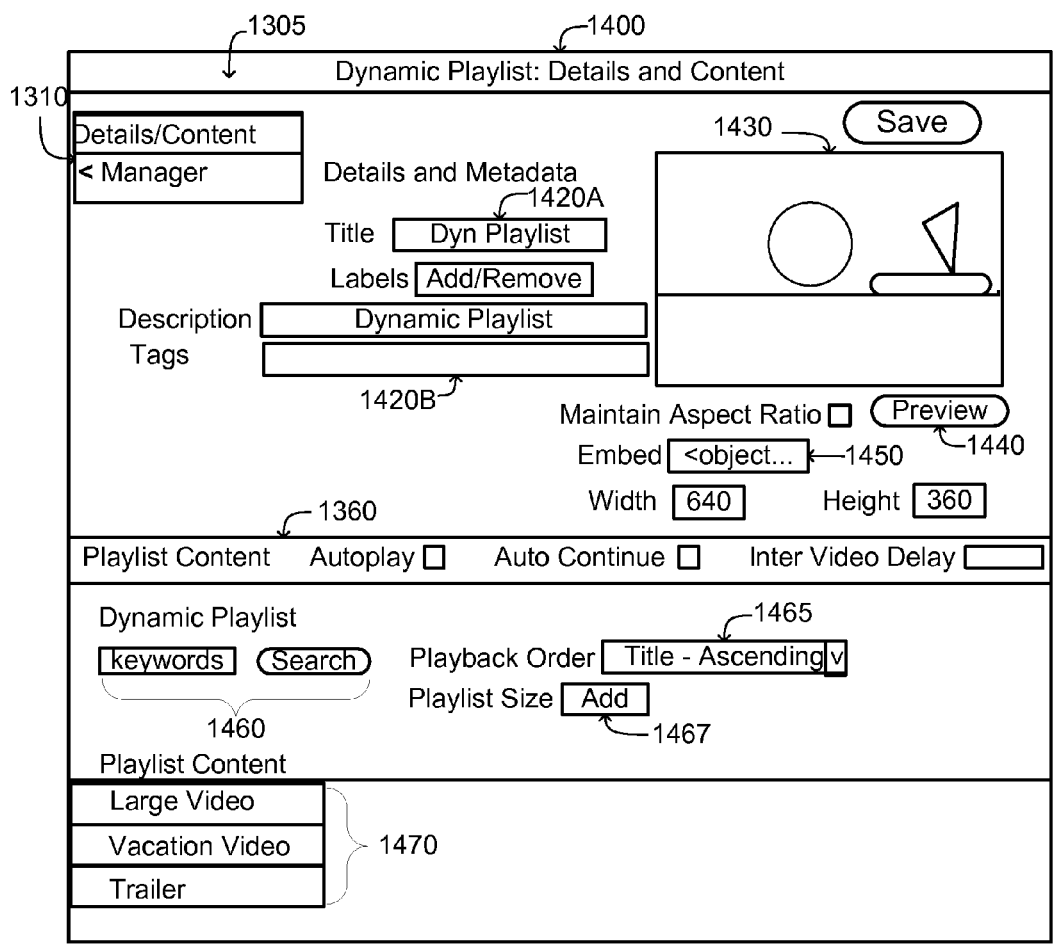
FIG. 14 is an example user interface for dynamic generation or modification of a playlist including video data in accordance with an embodiment.

FIG. 14 is an example user interface 1400 for dynamic generation of a playlist including one or more videos from the data store 120. The user interface 1400 includes a navigation menu 1310 and a playlist identifier 1305, as described above in conjunction with FIG. 13. In the example of FIG. 14, data associated with "Dynamic Playlist" is shown in data entry regions 1420A, 1420B. In one embodiment, an identifier or tag is displayed proximate to a data entry region 1420A, 1420B to differentiate between the data. In one embodiment, the data entry regions 1420A, 1420B are text entry boxes or other input mechanisms for receiving data, such as alphanumeric data.

A thumbnail image 1430 associated with video data included in the playlist is shown by the user interface 1400. The thumbnail image 1430 is displayed by a user device 160 when a web page including the playlist is accessed. In one embodiment, the thumbnail image 1430 is a frame captured from video data included in the playlist. A preview button 1440 presents the video data included in the playlist using a media player 115 responsive to receiving an input.

A media player identifier 1450 displays the media player configuration data, such as an embed code, that is communicated to a destination site 170. Displaying the media player configuration data allows replication of the media player 115 in different locations by copying the media player configuration data. A playlist configuration menu 1360 receives user input modifying one or more attributes of the playlist, as described above in conjunction with FIG. 13.

While the user interface 1300 shown in FIG. 13 allows a user to manually select video data for inclusion in a playlist, the user interface 1400 shown in FIG. 14 dynamically adds video data to a playlist based on metadata associated with the video data. To include video data in a playlist, a search interface 1460 receives search terms and identifies video data from the video table 410 associated with metadata matching, or similar to, the search terms. In one embodiment, after entering search terms, interaction with a playlist addition button 1467 adds video data associated with metadata matching, or similar to, the search terms to the playlist.

A playlist ordering selector 1465 receives input specifying the order in which video data included in the playlist is presented. For example, the playlist ordering selector 1465 receives input for presenting video data in the playlist in alphabetical order by title metadata, presenting video data in the playlist in reverse alphabetical order by title metadata associated with the video data or presenting video data in the playlist in another order based on metadata associated with the video data. The user interface 1400 also displays a playlist summary 1470 identifying the video data included in the playlist, review of the video data included in the playlist and the order in which video data is presented by the playlist.

The foregoing description of the embodiments has been presented for the purposes of illustration and description. It is not intended to be exhaustive or to limit the present embodiments to the precise form disclosed. Many modifications and variations are possible in light of the above teaching. It is intended that the scope of the present embodiments be limited not by this detailed description, but rather by the claims of this application. As will be understood by those familiar with the art, the present embodiments may be embodied in other specific forms without departing from the spirit or essential characteristics thereof. Likewise, the particular naming and division of the modules, routines, features, attributes, methodologies and other aspects are not mandatory or significant, and the mechanisms that implement the present embodiments or its features may have different names, divisions and/or formats. Furthermore, as will be apparent to one of ordinary skill in the relevant art, the modules, routines, features, attributes, methodologies and other aspects of the present embodiments can be implemented as software, hardware, firmware or any combination of the three. Also, wherever a component, an example of which is a module, of the present embodiments is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiments are in no way limited to implementation in any specific programming language, or for any specific operating system or environment. Accordingly, the disclosure intended to be illustrative, but not limiting, of the scope of the embodiments, which is set forth in the following claims.

What is claimed is:

1. A computer implemented method comprising:
   receiving video data for a video to be included in one or more user interfaces of one or more destination sites comprising data fields;
   receiving metadata associated with the video data;
   generating, by a processing device, configuration data to customize presentation of the video data via a media player to be included in the user interfaces of the destination sites;
   storing the video data, the metadata, and the configuration data in a data store;
   receiving supplemental content for presentation in conjunction with the video data, wherein the supplemental content is selected based on the metadata associated with the video data;
   determining the data store includes a subset of the metadata mapped to each of the data fields of the destination sites; and
   in response to determining that the data store includes the subset of the metadata, transmitting the video data, at least the subset of the metadata mapped to each of the data fields, the configuration data, and the supplemental content to the destination sites.

2. The computer implemented method of claim 1, further comprising:
   receiving a modification to the metadata;
   storing the modification to the metadata in the data store;
   receiving a modified selection of supplemental content for presentation in conjunction with the video data, wherein the modified selection of supplemental content is selected based on the modification to the metadata; and
   transmitting the modified selection of supplemental content to the destination sites.

3. The computer implemented method of claim 1, wherein the receiving the metadata comprises:
   identifying a plurality of images;
   setting a first image from the plurality of images as a first thumbnail image associated with the video data;
   communicating the first image to the destination sites; and
   receiving first analytical data describing interaction with the video data when the first image is set as the first thumbnail image.

4. The computer implemented method of claim 3, wherein the receiving the metadata further comprises:
   setting a second image from the plurality of images as a second thumbnail image associated with the video data;
   communicating the second image to the destination sites;
   receiving second analytical data describing interaction with the video data when the second image is set as the second thumbnail image; and
   determining which of the first thumbnail image and the second thumbnail image to associate with the video data based on the first analytical data and the second analytical data.

5. The computer implemented method of claim 4, wherein the determining which of the first thumbnail image and the second thumbnail image to associate with the video data based on the first analytical data and the second analytical data comprises:
   displaying the first analytical data and the second analytical data;
   receiving an input identifying the first image or the second image; and
   setting the first thumbnail image or the second thumbnail image for the video data based on the received input.

6. The computer implemented method of claim 4, wherein the second analytical data includes a number of times the video data is accessed when the second image is set as the second thumbnail image.

7. The computer implemented method of claim 3, wherein the identifying the plurality of images comprises:
   identifying a plurality of frames from the video data.

8. The computer implemented method of claim 7, wherein the identifying the plurality of frames from the video data comprises:
   receiving a first input selecting a first frame; and
   receiving a second input selecting a second frame.

9. The computer implemented method of claim 7, wherein the identifying the plurality of frames from the video data comprises:
   selecting a first frame and a second frame based on stored criteria.

10. The computer implemented method of claim 3, wherein the first analytical data includes a number of times the video data is accessed when the first image is set as the first thumbnail image.

11. The computer implemented method of claim 1, wherein the receiving the metadata comprises:
   receiving data identifying a cue point within the video data where the supplemental content is presented in place of the video data.

12. The computer implemented method of claim 11, the receiving the data identifying the cue point comprises:
   displaying a graphical representation of the video data including frames corresponding to temporal locations within the video data;

receiving an input identifying a time at which the cue point starts using the graphical representation of the video data; and receiving cue point metadata associated with the cue point.

13. The computer implemented method of claim 12, wherein the cue point metadata comprises a tag associated with the cue point and a length of time associated with the cue point.

14. The computer implemented method of claim 1, wherein the generating configuration data comprises:
receiving data restricting presentation of the video data to a geographic area.

15. The computer implemented method of claim 1, wherein the generating configuration data comprises:
receiving data restricting presentation of the video data to an identified domain.

16. A system comprising:
a memory; and
a processing device, coupled to the memory, to:
receive video data for a video to be included in one or more user interfaces of one or more destination sites comprising data fields;
receive metadata associated with the video data;
generate configuration data to customize presentation of the video data via a media player to be included in the user interfaces of the destination sites;
store the video data, the metadata, and the configuration data in the memory;
receive supplemental content for presentation in conjunction with the video data, wherein the supplemental content is selected based on the metadata associated with the video data;
determine the memory includes a subset of the metadata mapped to each of the data fields of the destination sites; and
in response to determining that the memory includes the subset of the metadata, transmit the video data, at least the subset of the metadata mapped to each of the data fields, the configuration data, and the supplemental content to the destination sites.

17. The system of claim 16, wherein the processing device is further to:
identify a modification to the metadata;
transmit the modification to the metadata to the memory for storage;
receive a modified selection of supplemental content for presentation in conjunction with the video data, wherein the modified selection of supplemental content is selected based on the modification to the metadata associated with the video data; and
transmit the modified selection of supplemental content to the destination sites.

18. The system of claim 16, wherein the memory comprises: a video table to store the video data and the metadata, the video table including an entry associated with the video data, the entry including an identifier associated with the video data, the video data, and the metadata.

19. The system of claim 18, wherein the entry further includes data associated with the video data and with a destination site that receives the video data.

20. The system of claim 18, wherein the video table further includes a log file describing changes to the metadata and identifying prior values of the metadata.

21. The system of claim 16, wherein the processing device is further to set a first image from a plurality of images from the video data as a first thumbnail image associated with the video data, communicate the first image to the destination sites and store first analytical data from the destination sites, the first analytical data describing interaction with the video data when the first image is set as the first thumbnail image.

22. The system of claim 21, wherein the processing device is further to set a second image from the plurality of images as a second thumbnail image associated with the video data, communicate the second image to the destination sites and store second analytical data from the destination sites, the second analytical data describing interaction with the video data when the second image is set as the second thumbnail image, and determine which of the first thumbnail image and the second thumbnail image to associate with the video data based on the first analytical data and the second analytical data.

23. The system of claim 22, wherein the processing device is further to determine which of the first thumbnail image and the second thumbnail image to associate with the video data based on the first analytical data and the second analytical data by displaying the first analytical data and the second analytical data to a user and setting the first thumbnail image or the second thumbnail image for the video data responsive to a received input identifying the first image or the second image.

24. The system of claim 22, wherein the first image comprises a first frame from the video data, and the second image comprises a second frame from the video data.

25. The system of claim 21, wherein the first analytical data includes a number of times the video data is accessed when the first image is set as the thumbnail image.

26. The system of claim 21, wherein the plurality of images comprises a plurality of frames from the video data.

27. The system of claim 16, wherein the processing device is further to identify a cue point within the video data where the supplemental content is presented in place of the video data.

28. The system of claim 27, wherein the processing device is further to identify the cue point within the video data by:
displaying a graphical representation of the video data including frames corresponding to different temporal locations within the video data;
receiving an input identifying a time at which the cue point starts using the graphical representation of the video data; and
receiving cue point metadata associated with the cue point.

29. A non-transitory machine-readable storage medium storing instructions which, when executed, cause a processing device to perform operations comprising:
receiving video data for a video to be included in one or more user interfaces of one or more destination sites comprising data fields;
receiving metadata associated with the video data;
generating, by the processing device, configuration data to customize presentation of the video data via a media player to be included in the user interfaces of the destination sites;
storing the video data, the metadata, and the configuration data in a data store;
receiving supplemental content for presentation in conjunction with the video data, wherein the supplemental content is selected based on the metadata associated with the video data;
determining the data store includes a subset of the metadata mapped to each of the data fields of the destination sites; and in response to determining that the data store includes the subset of the metadata, transmitting the video data, at least the subset of the metadata mapped to each of the data fields, the configuration data, and the supplemental content to the destination sites.

30. The non-transitory machine-readable storage medium of claim 29, wherein the operations further comprise:
receiving a modification to the metadata; and
storing the modification to the metadata in the data store;
receiving a modified selection of supplemental content for presentation in conjunction with the video data, wherein the modified selection of supplemental content is selected based on the modification to the metadata; and
transmitting the modified selection of supplemental content to the destination sites.

31. The non-transitory machine-readable storage medium of claim 29, wherein the operations further comprise:
identifying a plurality of images;
setting a first image from the plurality of images as a first thumbnail image associated with the video data;
communicating the first image to the destination sites;
receiving first analytical data describing interaction with the video data when the first image is set as the first thumbnail image;
setting a second image from the plurality of images as a second thumbnail image associated with the video data;
communicating the second image to the destination sites;
receiving second analytical data describing interaction with the video data when the second image is set as the second thumbnail image; and
determine which of the first thumbnail image and the second thumbnail image to associate with the video data based on the first analytical data and the second analytical data.

32. The non-transitory machine-readable storage medium of claim 31, wherein identifying the plurality of images comprises:
identifying a plurality of frames from the video data.

33. The non-transitory machine-readable storage medium of claim 32 wherein identifying the plurality of frames from the video data comprises:
receiving a first input selecting a first frame; and
receiving a second input selecting a second frame.

* * * * *